(12) United States Patent
Lee et al.

(10) Patent No.: US 6,883,108 B2
(45) Date of Patent: Apr. 19, 2005

(54) FAULT-TOLERANT ROUTING SCHEME FOR A MULTI-PATH INTERCONNECTION FABRIC IN A STORAGE NETWORK

(75) Inventors: Whay S. Lee, Newark, CA (US); Randall D. Rettberg, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 601 days.

(21) Appl. No.: 09/850,909

(22) Filed: May 7, 2001

(65) Prior Publication Data

US 2003/0023893 A1 Jan. 30, 2003

(51) Int. Cl.$^7$ .............................................. G06F 11/00
(52) U.S. Cl. ............................................. 714/4; 710/38
(58) Field of Search ........................ 714/3, 4; 710/38; 709/238; 370/351

(56) References Cited

U.S. PATENT DOCUMENTS

| | | | | |
|---|---|---|---|---|
| 5,627,990 A | * | 5/1997 | Cord et al. | .................. 711/122 |
| 5,689,646 A | | 11/1997 | Thorson | |
| 5,689,661 A | | 11/1997 | Hayashi et al. | |
| 5,701,416 A | | 12/1997 | Thorson et al. | |
| 5,720,025 A | | 2/1998 | Wilkes et al. | |
| 5,737,628 A | | 4/1998 | Birrittella et al. | |
| 5,970,232 A | | 10/1999 | Passint et al. | |
| 6,016,510 A | | 1/2000 | Quattromani et al. | |
| 6,023,753 A | | 2/2000 | Pechanek et al. | |
| 6,055,618 A | | 4/2000 | Thorson | |
| 6,101,181 A | | 8/2000 | Passint et al. | |
| 6,145,028 A | * | 11/2000 | Shank et al. | ................... 710/31 |
| 6,157,962 A | * | 12/2000 | Hodges et al. | .................. 710/1 |
| 6,167,502 A | | 12/2000 | Pechanek et al. | |
| 6,434,637 B1 | * | 8/2002 | D'Errico | ....................... 710/38 |
| 6,658,478 B1 | * | 12/2003 | Singhal et al. | ............... 709/232 |
| 2002/0065962 A1 | * | 5/2002 | Bakke et al. | .................. 710/38 |
| 2002/0141345 A1 | * | 10/2002 | Szviatovszki et al. | ...... 370/238 |
| 2003/0048771 A1 | * | 3/2003 | Shipman | ..................... 370/351 |

FOREIGN PATENT DOCUMENTS

| | | |
|---|---|---|
| DE | 199 23 245 | 5/1999 |
| EP | 0 785 512 | 7/1997 |
| WO | 99/26429 | 5/1999 |

OTHER PUBLICATIONS

Cisco Systems Glossary Tool, Routing Table: Technical Definition, 1999–2002, Cisco Systems.*

"A Routing Protocol for Finding Two Node–Disjoint Paths in Computer Networks," Ishida, et al., IEEE, 1995, pp. 340–347.

(Continued)

*Primary Examiner*—Scott Baderman
*Assistant Examiner*—Marc Duncan
(74) *Attorney, Agent, or Firm*—Robert C. Kowert; Meyertons, Hood, Kivlin, Kowert & Goetzel, P.C.

(57) ABSTRACT

Embodiments of a routing system are disclosed, including a method for routing a plurality of communications in a storage system. The storage system may include a plurality of nodes interconnected by an interconnection fabric that provides multiple independent paths between each source node and each destination node. Some nodes may be connected to one or more disk drives. The method may include receiving a communication to be sent from a source node to a destination node, selecting a communication path from the multiple independent paths between the source and destination nodes, and sending the communication on the selected communication path. This process may be repeated so that multiple communications may be sent. Each communication path is systematically selected at least occasionally to send at least one of the communications to prevent any path from having undetected problems.

36 Claims, 16 Drawing Sheets

OTHER PUBLICATIONS

International Search Report from PCT/US 02/14565, mailed Aug. 26, 2002.

Bradley Kuszmaul, Mercury Computer Systems, Inc., "The RACE Network Architecture," (posted at www.mc.com/techlit/#tech_brief prior to this), 6 pages.

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD–98–1031, 16 pages.

Prasant Mohapatra, Wormhole Routing Techniques for Directly Connected Multicomputer Systems, ACM Computing Surveys, vol. 30, No. 3, Sep. 1998, 37 pages.

Christopher Glass and Lionel Ni, "The Turn Model for Adaptive Routing," Journal of the Association for Computing Machinery, vol. 41, No. 5, Sep. 1994, pp. 874–902.

Reddy, Dept. of Computer & Information Sciences, "A Dynamically Reconfigurable WDM LAN Based on Reconfigurable Circulant Graph," IEEE, 1996, 4 pages.

Various Abstracts beginning with Funahashi, Jouraku and Amano, "Adaptive Routing for Recursive Diagonal Torus," Transactions of the Institute of Electronics, Information and Communication Engineers D–I, vol. J83D–I, No. 11, Nov. 2000, pp. 1143–1153.

Milan Kovacevic, Center for Telecommunications Research, "On Torus Topologies with Random Extra Links," IEEE 1996, pp. 410–418.

Dally, et al., The Torus Routing Chip, Distributed Computing, Springer–Verlag 1986, pp. 187–196.

Susan Hinrichs, "A Compile Time Model for Composing Parallel Programs," IEEE Parallel and Distributed Technology, 1995, 19 pages.

"CRAY T3D System Architecture Overview Manual, " ftp://ftp.cray.com/product–info/mpp/T3D_Architecture_Over/T3D.overview.html, Cray Research, 1993, 40 pages.

Marco Fillo, et al., "The M–Machine Multicomputer," Laboratory for Computer Science, Massachusetts Institute of Technology, A.I. Memo No. 1532, Ann Arbor,. Mar. 1995, 14 pages.

Noakes, et al., "The J–Machine Multicomputer: An Architectural Evaluation," Proceedings of the 20th International Symposium on Computer Architecture, May 1993, 12 pages.

Dally, et al., "Architecture of a Message–Driven Processor," International Conference on Computer Architecture, Jun. 1987, pp. 189–196.

Dennison, Lee and Dally, "High–Performance Bidirectional Signalling in VLSI," Massachusetts Institute of Technology, Oct. 12, 1992, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al., "The Reliable Router: A Reliable and High–Performance Communication Substrate for Parallel Computers," Proceedings of the First International Parallel Computer Routing and Communication Workshop, Seattle WA, May 1994, 15 pages.

Dennison, et al., "Low–Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicomputer Networks," Dept. of Electrical Engineering and Computer Science, Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes," F. Thomson Leighton, Morgan Kaufmann Publishers, 1992, pp. 1–831.

Christopher J. Glass and Lionel Ni, "Fault–Tolerant Wormhole Routing in Meshes," Technical Report, MSU–CP–S–ACS–72, Oct. 30, 1992 (revised May 25, 1993), 28 pages.

Stefan Savage and John Wilkes, "AFRAID—A Frequently Redundant Array of Independent Disks," Proceedings of the 1996 USENIX Technical Conference, pp. 27–39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU–CP–S–ACS–44, Oct. 10, 1991 (revised Mar. 2, 1992), pp. 278–287 (numbered herein as 1–20).

Thomas Stricker, "Message Routing on Irregular 2D–Meshes and Tori," School of Computer Science, Carnegie Mellon Univ., Jan. 15, 1991, pp. 170–177 (numbered herein as 1–19).

Dally, et al., "The J–Machine: A Retrospective," in 25 Years of the International Symposia on Computer Architecture—Selected Papers. Pp. 54–58.

* cited by examiner

H - Host Interface or Line Card
S - Storage Device
M - Memory (e.g. Storage Cache)
C - Controller, (e.g. RAID Controller)
R - Router Node

300

FAULT-TOLERANT ROUTING SCHEME FOR A MULTI-PATH INTERCONNECTION FABRIC IN A STORAGE NETWORK

BACKGROUND OF THE INVENTION

1. Field of the Invention

This invention relates generally to the field of computer systems and, more particularly, to communication routing or switching within interconnection fabrics for computer storage networks.

2. Description of the Related Art

Computer systems are placing an ever-increasing demand on data storage systems. In many of the data storage systems in use today, data storage arrays are used. The interconnection solutions for many large storage arrays are based on bus architectures such as small computer system interconnect (SCSI) or fibre channel (FC). In these architectures, multiple storage devices such as disks may share a single set of wires, or a loop in the case of FC, for data transfers.

Such architectures may be limited in terms of performance and fault tolerance. Since all the devices share a common set of wires, only one data transfer may take place at any given time, regardless of whether or not all the devices have data ready for transfer. Also, if a storage device fails, it may be possible for that device to render the remaining devices inaccessible by corrupting the bus. Additionally, in systems that use a single controller on each bus, a controller failure may leave all the devices on its bus inaccessible.

Conventional systems have addressed these problems in several ways. One solution is to divide the devices into multiple subsets utilizing multiple independent buses, such as two independent SCSI buses, for added performance. Another solution suggests connecting dual buses and controllers to each device to provide path fail-over capability, as in a dual loop FC architecture. An additional solution may have multiple controllers connected to each bus, thus providing a controller fail-over mechanism.

In a large storage array, component failures may be expected to be fairly frequent. Because of the higher number of components in a system, the probability that a component will fail at any given time is higher, and accordingly, the mean time between failures (MTBF) for the system is lower. However, the above conventional solutions may not be adequate for such a system. In the first solution described above, the independent buses may ease the bandwidth constraint to some degree, but the devices on each bus may still be vulnerable to a single controller failure or a bus failure. In the second solution, a single malfunctioning device may still potentially render all of the buses connected to it, and possibly the rest of the system, inaccessible. This same failure mechanism may also affect the third solution, since the presence of two controllers does not prevent the case where a single device failure may force the bus to some random state.

When routing messages over an interconnection fabric or in a network, it is desirable that communication between nodes be affected by errors as little as possible. At times, adverse transmission conditions may occur in the network when one device is sending a packet to another device on the network. For example, the network may become overly congested with packets traveling between devices. Additionally, a fault condition, or failure in the interconnection fabric, may prevent a packet from proceeding along its proposed route. If a fault or congestion prevents the message from being sent on one path, it may be helpful to have an alternate path on which to resend the message.

Multi-path interconnection fabrics are useful because they provide path fail-over capabilities to networks. For example, in certain FC systems, two FC loops are connected into each disk drive so that the disks remain accessible even if one of the FC loops is severed. Because the redundant path can be used when an error occurs in the first path, the system is one-fault tolerant.

Even these systems capable of using multiple independent paths may be susceptible to failure, though. The independent paths are typically used in a primary/backup configuration, which means that only the primary path is exercised during normal operation. The backup path(s) are not used until a fault is detected in the primary path. Generally, faults are a rare occurrence, so this configuration allows the backup paths to sit unused for long periods of time. While the backup paths are dormant, faults may be developing in either the fail-over mechanism (e.g. fail-over software) or the backup paths themselves. Since these backup routes are not being exercised, these errors may go undetected until the primary path fails. Thus, a backup path may be unavailable at the very time it is critically needed.

Another concern in primary/backup systems is that the primary path may be declared permanently unavailable despite only experiencing a temporary failure. For example, routing circuitry may experience transient or resettable faults resulting from EM-interference, alpha particle bombardment or semiconductor latch-ups. Alternately, a message may fail to reach a destination node because a route was congested. These errors are not permanent, so the route experiencing them may be available again once the errors are reset or their causes are removed. It may be undesirable to declare the path permanently failed in these situations since it may be usable again after the cause of the failure disappears.

SUMMARY

Various embodiments of a routing system are disclosed. In one embodiment, a method for routing a plurality of communications in a storage system is disclosed. The storage system includes a plurality of nodes interconnected by an interconnection fabric that provides multiple independent paths between each source node and each destination node. Some of the nodes in the interconnect are connected to one or more disk drives. The method includes receiving a communication to be sent from a source node to a destination node, selecting a communication path from the multiple independent paths between the source and destination nodes, and sending the communication on the selected communication path. This process of receiving a communication, selecting a communication path, and sending the communication is repeated so that multiple communications can be sent. Each of the communication paths is systematically selected at least once, and thus each path is used to send at least one of the communications. In some embodiments, each of the paths may be selected the same number of times as each of the other paths.

In some embodiments, selecting a communication path may involve calculating the path. The path may be calculated from a pair of coordinates identifying the source node and the destination node. In other embodiments, the method may include maintaining a routing table that has multiple entries indicating the communication paths. Selecting a path may involve selecting an entry from the routing table in these embodiments. The number of times that a path is selected relative to the number of times the other paths are chosen may correspond to the number of routing table entries for that path.

In some embodiments, the method may include detecting an error on a communication path when sending a communication on that path and resending the communication on a different path.

In another embodiment, the method may include assigning a preference to each communication path and selecting each path according to its preference, which may result in a more preferred path being selected more often than a less preferred path.

In another embodiment, a storage system is configured to use the routing system. The storage system includes an interconnection fabric coupling together a plurality of nodes and providing multiple independent routes between each source node and each destination node. Some of the nodes are connected to one or more disk drives. The storage system also includes a source configured to send a plurality of communications to a destination node. The source includes a source node and a source device configured to communicate with the source node. The source is configured to send multiple communications to the destination node. The source sends the communications by systematically selecting a communication path from the multiple independent communication paths and sending a communication on the selected communication path. The source is configured to repeatedly select paths and send communications on selected paths until all of the communications are sent. The source is configured to select each of the paths at least once so that at least one of the communications is sent on each path.

Another embodiment discloses a device configured to be used with the routing system. The device has an interface configured to communicate with a source node in an interconnection fabric that couples together a plurality of nodes and provides multiple independent communication paths between the source node and a destination node. The device has a controller configured to communicate multiple communications to the source node so that the source node can send these communications to one or more disk drives coupled to the destination node. The controller is configured to communicate the communications to the source node by systematically selecting a communication path, encoding the selected path in a communication, and communicating the communication to the source node. The controller is configured to repeatedly select, encode and communicate until all of the communications have been communicated to the source node. The controller is configured to select each of the communication paths at least once so that each of the communication paths is encoded in at least one of the communications.

In another embodiment, a node is configured to be used with the routing system. The node has a routing unit and a plurality of input and output ports. The node is configured to be connected to an interconnection fabric coupling together a plurality of nodes and providing a plurality of independent communication paths between the node and a destination node. The routing unit is configured to send a plurality of messages to one or more disk drives coupled to the destination node. The routing unit is configured to send the communications by systematically selecting a communication path from the multiple independent communication paths and sending a communication on the selected communication path. The routing unit is configured to repeatedly select paths and send communications on selected paths until all of the communications are sent. The routing unit is configured to select each of the paths at least once so that at least one of the communications is sent on each path.

Figure 1:
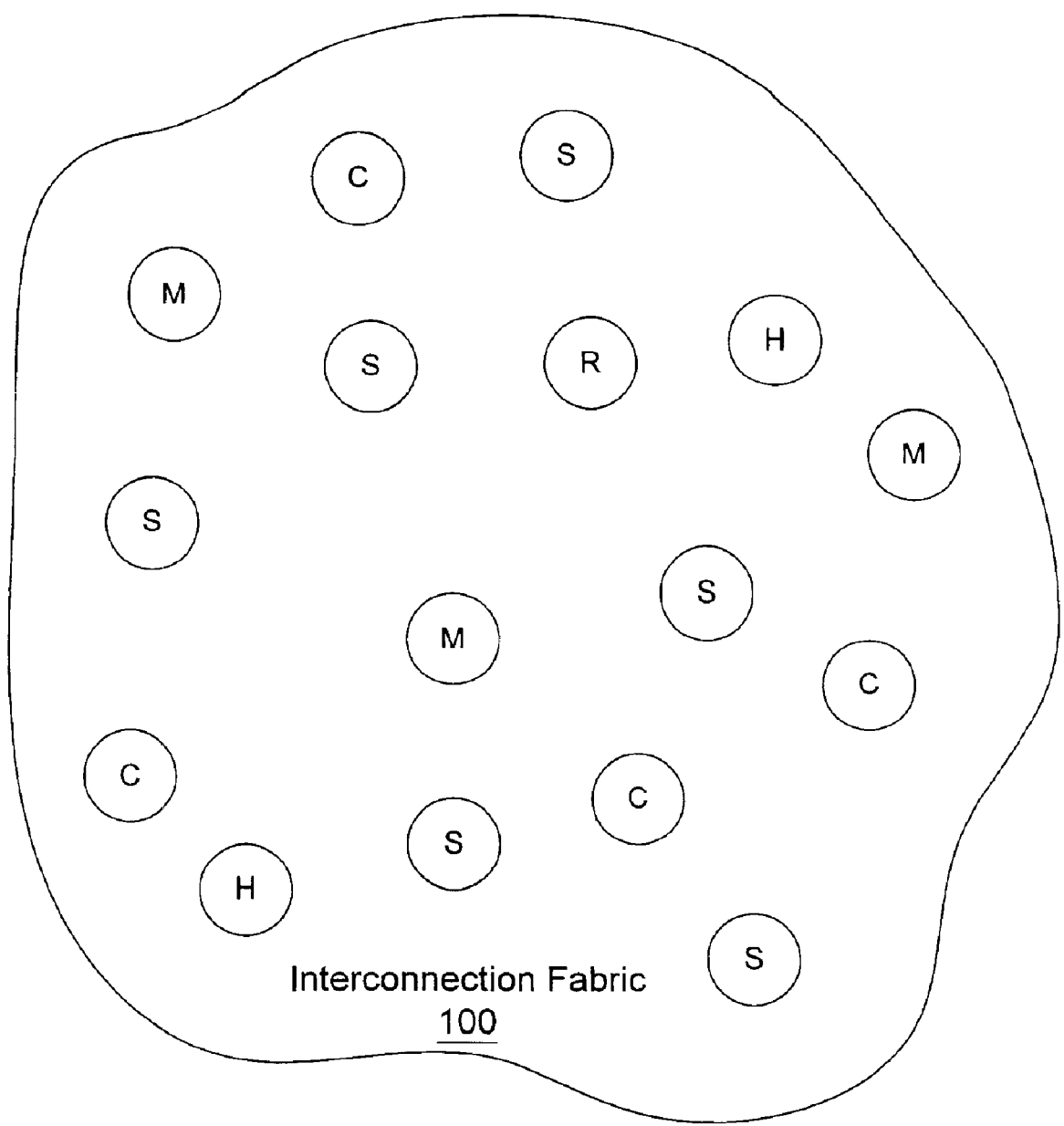
FIG. 1 is a diagram of one embodiment of an interconnection fabric using multiple independent paths.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

The following figures illustrate various interconnection fabrics and nodes within interconnection fabrics that may use a routing scheme according to various embodiments of the invention. While various embodiments are explained by reference to specific interconnection fabrics, it should be readily apparent to one skilled in the art that embodiments of the present invention could be implemented in any multi-path interconnection fabric or topology.

Turning now to FIG. 1, a diagram of one embodiment of an interconnection fabric using multiple independent paths is shown. An interconnection fabric 100 is shown with several nodes. Each node may support one or more different types of devices in a storage system. The nodes are labeled with the letters C, H, M, R and S. A node with the letter C means the node may be configured to support a controller such as a Redundant Array of Inexpensive Disks (RAID) controller. A node with the letter H means the node may be configured with a host interface or line card that may serve as an interface to a host computer. A node with the letter R means the node may be configured as a routing node and merely expands the communication paths available between other nodes. A node with the letter S means the node may be configured as a mass storage node and may be connected to one or more mass storage devices such as hard disk drives. A node with the letter M means the node may be configured as a storage cache memory node that provides, for example, a hierarchical storage cache for one or more mass storage nodes. Also, nodes may support any combination of these features. It is noted that while the nodes are configured and labeled in the embodiment of FIG. 1, this is only an exemplary drawing. In other embodiments, there may be other configurations that have a fewer or greater number of nodes and the nodes may be configured and used differently. For example, there may be a fewer or greater number of S nodes and a fewer or greater number of H nodes.

Generally speaking, each node may be connected to each other node in the fabric by multiple communication paths (not shown in FIG. 1). The communication paths form the fabric such that each communication path may be completely independent of each other path. Therefore, each node may have multiple possible paths to use when communicating with another node. Multiple independent paths may allow a source node and a destination node to continue communicating with each other even if one or more communications paths or nodes between the source and destination nodes becomes inoperative. The interconnect fabric may be a point-to-point interconnect between each node, in which multiple independent paths exist between a source node and a destination node. In one embodiment, every node has multiple independent paths to communicate with every other node. The path independence of the fabric may allow a node or a path to fail or experience adverse conditions (e.g. congestion) without affecting any other node or path.

The figures that follow will describe an embodiment of a node of interconnection fabric 100 and some exemplary diagrams of possible forms that interconnection fabric 100 may take.

Figure 2:
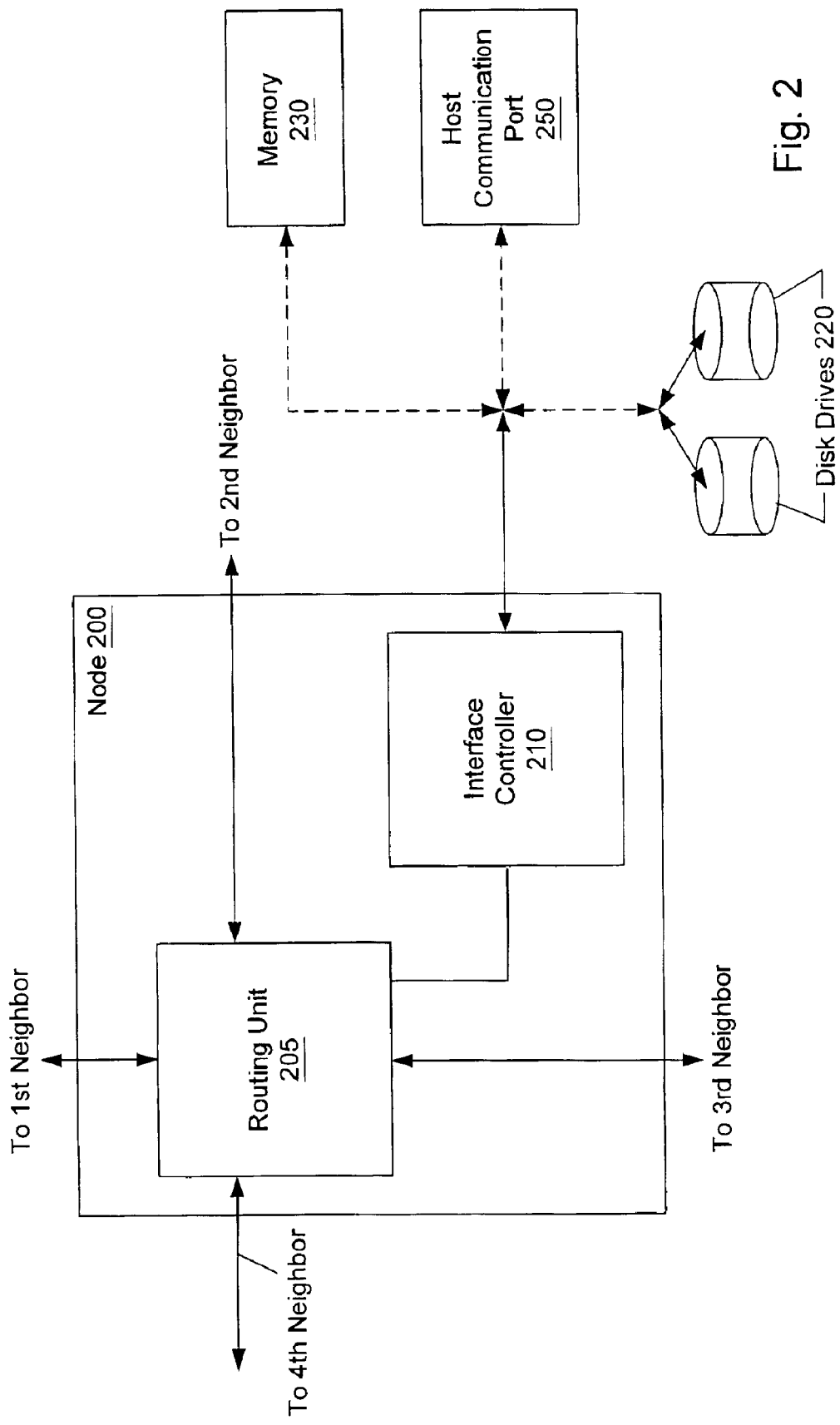
FIG. 2 is a block diagram a node of an interconnection fabric, according to one embodiment.

Turning now to FIG. 2, a block diagram of one embodiment of a node of the interconnection fabric of FIG. 1 is shown. In FIG. 2, a node 200 includes a routing unit 205 coupled to an interface controller 210. Routing unit 205 may be configured to communicate through multiple ports. In one particular embodiment, there may be four ports and the ports may be bi-directional. Thus, routing unit 205 may communicate with four neighboring nodes allowing four independent routing paths. In one alternative embodiment, routing unit 205 may be configured with four unidirectional ports: two inputs and two outputs. The choice between using bi-directional and unidirectional ports may be influenced by competing factors. The unidirectional design may be simpler, but it may only tolerate a single failure of a neighboring node. The bi-directional design tolerates more failures but may require a more complex routing unit 205. The size of the storage system array may be a determining factor, since for a very large number of storage devices, a three-fault tolerant bi-directional fabric may become desirable to attain a reasonably low MTBF.

In addition to the nodes communicating with other nodes, in one embodiment, interface controller 210 may be configured to communicate with one or more disk drives 220. It is noted that disk drive refers to any semi-permanent or permanent storage place for digital data that is not memory. Memory is a temporary workspace for executing instructions and processing data. A disk drive may be any peripheral storage device that holds, spins, reads and writes magnetic or optical disks or any other suitable storage media. A disk drive may be a receptacle for disk cartridges, disk packs or floppy disks, or it may contain non-removable disk platters like most personal computer hard disks.

In some embodiments, interface controller 210 may be configured to communicate with one or more random access memories 230, such as a hierarchical storage cache memory or other type of memory and a memory controller. In yet another embodiment, interface controller 210 may be configured to communicate with a host or a RAID controller through a communication port, such as a peripheral component interface (PCI) bus. It is also contemplated that interface controller 210 may have all of these functions or any combination of the above described functions. For example, interface controller 210 may be configurable for selecting between any one of the different types of interfaces described above. Thus, the ability to communicate with and/or control storage devices and communicate to hosts in an interconnection fabric may advantageously increase the reliability, performance and flexibility of large storage systems.

It is further contemplated that interface controller 210 may not have any devices attached. In such an embodiment, node 200 may simply connect to neighbors through routing port 205. Thus, node 200 may be used in the interconnection fabric of FIG. 1 to increase the number of possible communications paths available. Therefore, some nodes may be unpopulated with storage or other devices and used as routing nodes to increase the number of paths in the interconnection fabric. Although it is contemplated that the above described node embodiments may be used in the following figures when nodes are discussed, there may be other embodiments of the nodes which are modifications of the above described node embodiments.

In some embodiments, if node 200 is sending a message, routing unit 205 may be configured to select or calculate the route to be used. In other embodiments, one or more of the devices configured to communicate with node 200 may be configured to select or calculate the route.

Figure 3A:
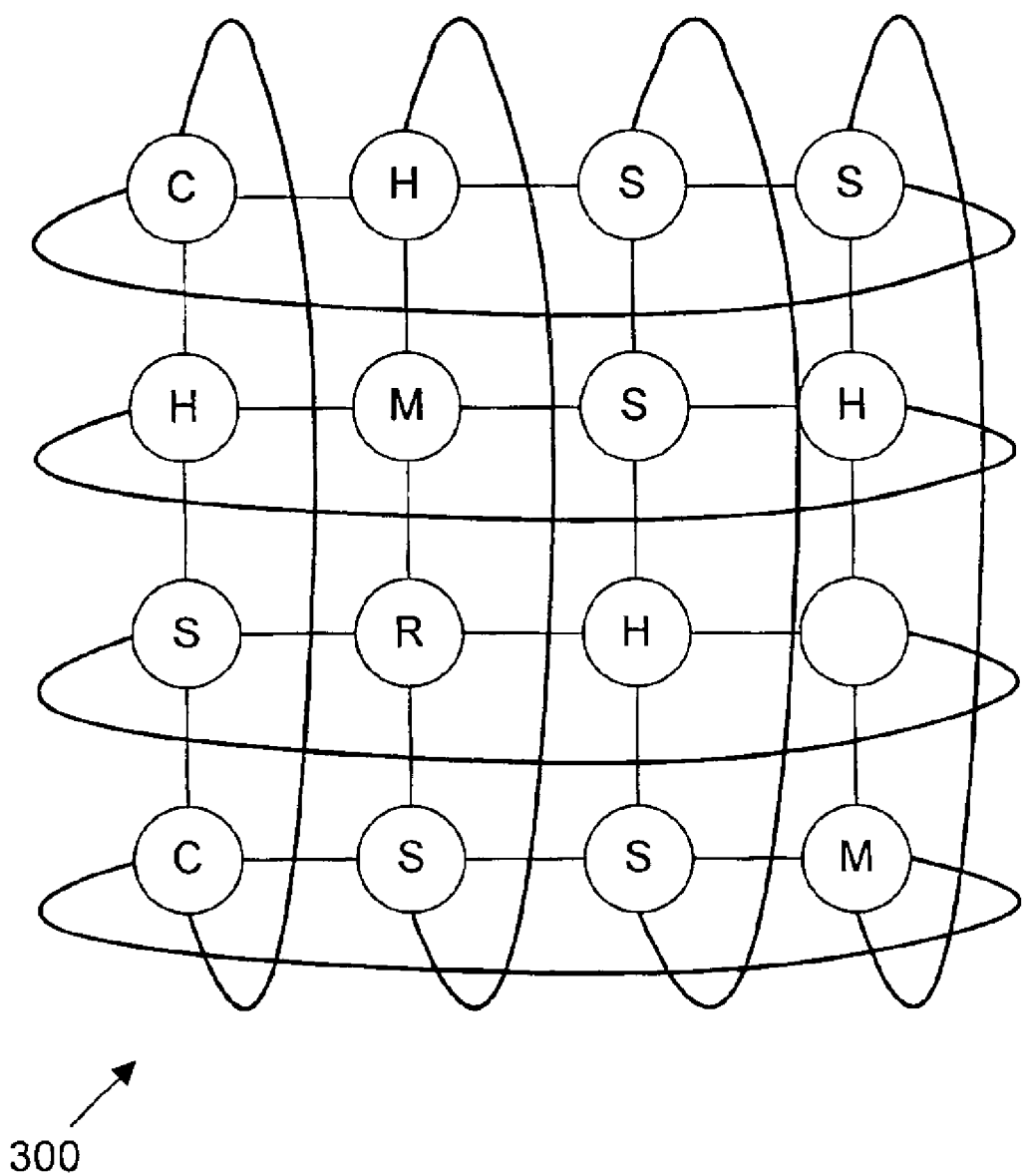
FIG. 3A is a diagram of one embodiment of a torus interconnection fabric.

Referring to FIG. 3A, a diagram of one embodiment of a torus interconnection fabric is shown. A torus fabric 300 may be employed as the interconnection fabric depicted in FIG. 1. In FIG. 3A, torus fabric 300 uses a two-dimensional (2-D) array topology with the beginning nodes of each row and column connected to the respective endpoints of each row and column. For example, if the 2-D array is an N by M array, where N and M are both positive integers, then the first node in row one would be connected to the last node in row one, in addition to all the other nodes neighboring the first node. Likewise, from a column perspective, the top node in column one is connected to the bottom node in column one in addition to all the other nodes neighboring the top node. The remaining nodes are connected in similar fashion such that every node in the fabric of torus 300 is connected to its four neighboring four nodes. It is noted that torus 300 is shown as a flat two-dimensional array with longer connections between the endpoints. These may be logical connections, and the physical layout of the nodes may be different. For example, each row may be physically oriented in the shape of a ring, such that the distance from the last node to the first node may be nearly the same as the distance between all the other nodes and likewise for the columns.

The level of interconnection described above for a torus interconnect fabric means that in one embodiment each node may have four ports with which to communicate to the other nodes. In one embodiment, each of the four ports is a bi-directional port, thus allowing both inputs and outputs from each neighbor. In an alternative embodiment, each of the four ports is a unidirectional port, thus allowing two inputs and two outputs. Thus, torus 300 may provide an interconnection fabric with multiple independent paths for a storage device system.

Although the above torus 300 is described using a two-dimensional array, it is contemplated that this same fabric may be extended to include a multi-dimensional array beyond two dimensions (not shown). One embodiment of a three dimensional array may include several two-dimensional arrays "stacked" or layered such that each node now has six neighboring nodes instead of four and each layer is connected together using the two additional ports.

In an additional embodiment, torus 300 may be reduced to a mesh (not shown). A mesh, like torus 300, may be logically arranged in either a 2-D or 3-D array. However a mesh does not have the wrap around connections connecting the row and column endpoints together that the torus has. Although the mesh does have multiple independent paths with which the nodes may communicate, not all the nodes have the same number of multiple independent paths.

Figure 3B:
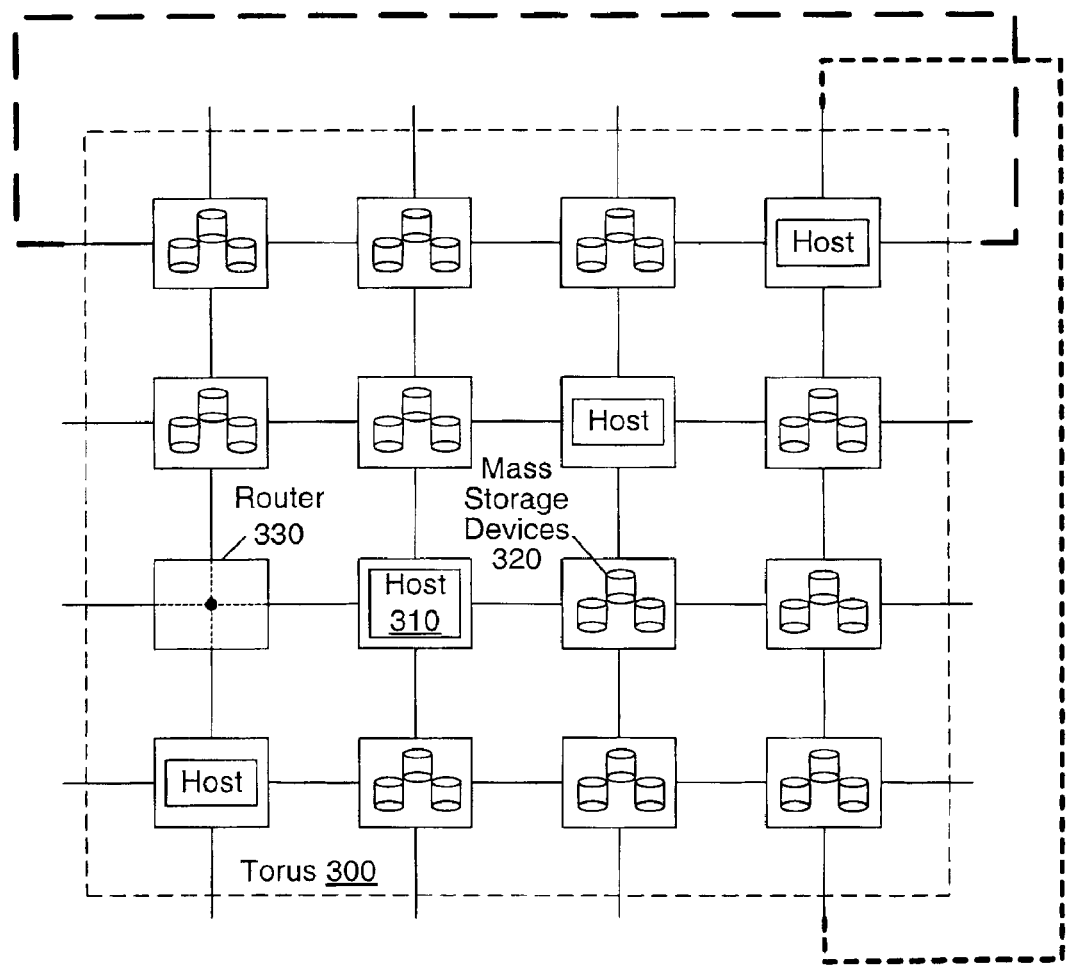
FIG. 3B is a diagram of one embodiment of a node configuration of a torus interconnection topology.

Referring now to FIG. 3B, a diagram of one embodiment of a node configuration of a torus interconnection topology is shown. The torus topology 300 of FIG. 3A is shown here with some of the interconnections not shown for clarity. In torus 300 of FIG. 3B, a portion of the nodes is shown comprising storage devices, such as storage devices 320. In one embodiment, storage devices 320 may be disk drives. Another portion of the nodes are shown with host blocks in them, such as host 310. Host 310 may be a host communication port or line card. Other nodes, such as router node 330, may include a routing unit to expand the interconnect paths but may not include a device such as a disk drive or host interface. Thus, a storage system may include a plurality of nodes connected together by an interconnect fabric such as a torus fabric. The interconnect fabric may provide multiple independent point-to-point communication paths between nodes sending communications and nodes receiving the communications. A portion of the nodes may include disk drives. Other nodes may include storage controllers or host interfaces. In general, a mass storage system may be provided by the plurality of nodes and interconnect paths. The multiple independent paths between nodes may provide fail-over redundancy and/or increased bandwidth for communications between source and destination nodes. As mentioned above, many large storage systems use a large number of disks. To reduce costs, inexpensive and smaller disks may be used. However, since more disks may increase the failure rate, a highly redundant interconnection fabric, such as torus 300 may be used to provide a reliable overall system. For example, a storage controller node may send a write com mand and write data to a storage node having one or more disk drives. If the first path chosen for the write command fails, the command may be resent on a second path.

Additionally, the multiple paths of the torus interconnect allow for multiple parallel communications and/or disk operations that may be initiated over different paths, thereby possibly increasing the bandwidth and performance of the storage system. In a torus storage system with multiple controllers/host attachments, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

It is noted that other embodiments may use fewer or more storage devices 320 and fewer or more host 310 nodes to facilitate cost and performance tradeoffs. In addition, and as mentioned above, it is contemplated that some nodes may be configured to communicate with RAID controllers and/or storage cache memory.

The torus fabric is just one example of a multiple path independent interconnect that may provide improved reliability and performance as described above. Other examples are described below.

Figure 4:
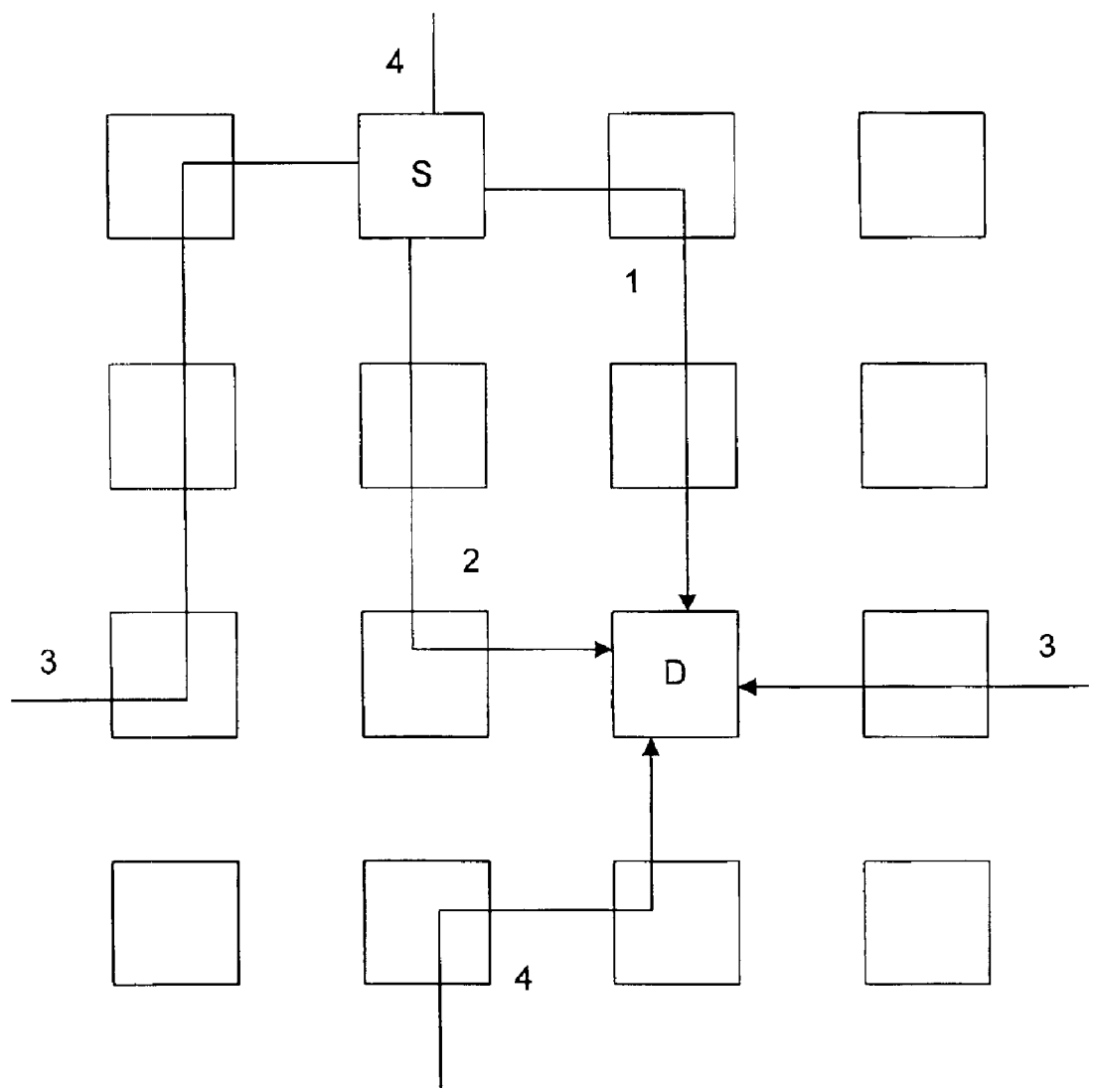
FIG. 4 is an illustration of multiple independent paths between nodes in a system having a plurality of nodes connected by a multiple independent path interconnection fabric according to one embodiment.

Turning now to FIG. 4, a plurality of nodes connected by an interconnection fabric using multiple independent paths is illustrated. No particular interconnect fabric scheme is shown since various different multiple independent path interconnects may be employed. In one embodiment, the nodes may be connected by a torus fabric. FIG. 4 shows one possible combination of four independent paths from source node S to destination D. Many other combinations of such redundant paths are possible. Note that each path may traverse multiple intermediate nodes between the source and destination.

Figure 5A:
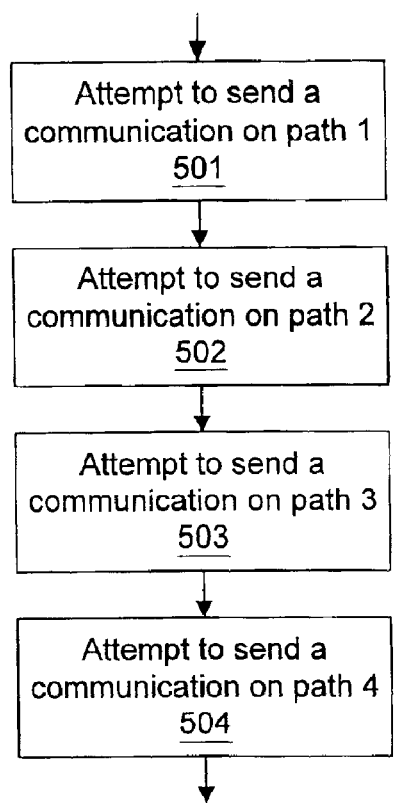
FIG. 5a is an illustration of a method of routinely exercising redundant paths according to one embodiment.

Referring now to FIG. 4 and FIG. 5a together, a method is illustrated for routing communications within a multiple independent path interconnect fabric so that redundant paths are tried routinely. A communication may originate at source node S. To communicate with destination node D, source node S may attempt to use path 1. Source node S may attempt to send a second communication using path 2. Path 2 may be attempted even though path 1 is available to send the second message. Similarly, if four independent paths are available between S and D, it may be desirable to routinely exercise paths 3 and 4 as well. Thus, an attempt may be made to send a third communication on path 3, even though paths 1 and 2 are available, and similarly, an attempt to send a fourth communication on path 4 may be made even though paths 1–3 are available. In one embodiment, source node S may attempt to send communications by sequentially alternating between paths 1–4 each time. In another embodiment, source node S may structure its path selection so that each of the alternate paths is chosen at least once for a given time period and/or number of communications sent. In other embodiments, the source node may choose the paths sequentially, but instead of choosing each path only once, some of the paths may be chosen several times in succession before the next path is chosen. Paths may be chosen periodically in some embodiments, but other embodiments may instead choose paths in a more random manner while still exercising each of the alternate paths at least once within a set time period and/or number of communication attempts. Different path selection algorithms may be used in other embodiments.

Figure 5B:
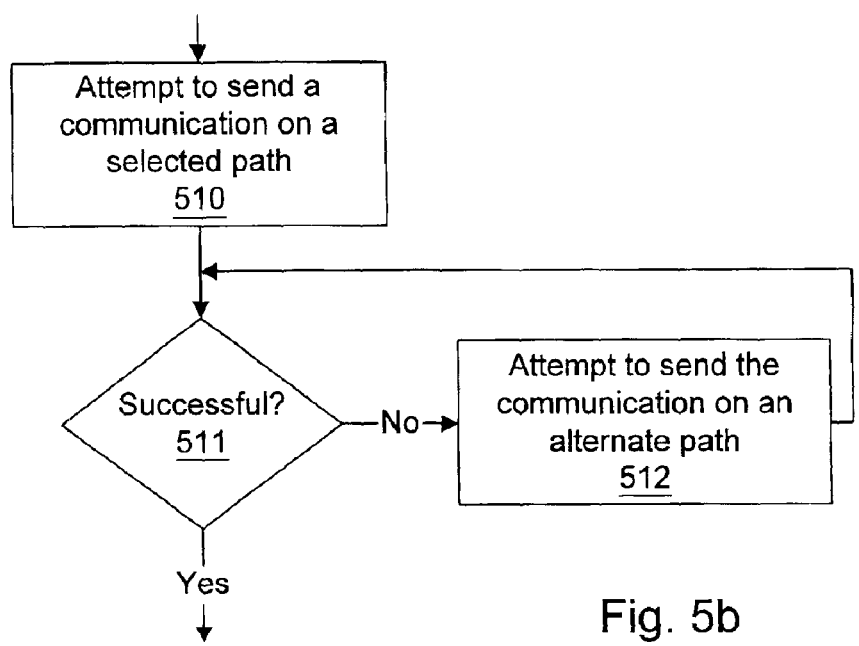
FIG. 5b is an illustration of a method of resending a failed communication according to one embodiment.

In some situations, one or more of the attempts to send a communication may fail. The attempt may fail due to various conditions in the path, including a failure in an intermediate node, congestion etc. If the attempt fails, the source node S may retry the communication using an alternate path, as shown in FIG. 5b. For example, if the attempt to send a communication on path 1 failed, the source node S may reattempt the communication using one of the alternate paths. Similarly, if the attempt to send the communication on the alternate path fails, the source node may retry the communication on another alternate path, if available. In some embodiments, a failed attempt to send a communication on a path may affect how often that path is attempted for future communications, as will be explained in more detail below.

In the embodiments described in regard to FIG. 5, the intermediate nodes (e.g. those making up the path from S to D) may not make any decisions regarding what paths to try. In some embodiments, the intermediate nodes may not have complete knowledge of the path. For example, an intermediate node may only know that some message or communication came in from one of its input ports and requested to go out a specified one of its four output ports. The intermediate nodes may simply attempt to pass the message or communication from the input port to the requested output port. If the attempt succeeds, the communication/message progresses to the next node, until the message reaches its destination, upon which the message is delivered to the target device. Otherwise, the path may be considered bad or congested, etc. This condition may be signaled back to the source (e.g. with the cooperation of upstream intermediate nodes in the path). This path failure notification may prompt the source to select another path for the retry.

Figure 6A:
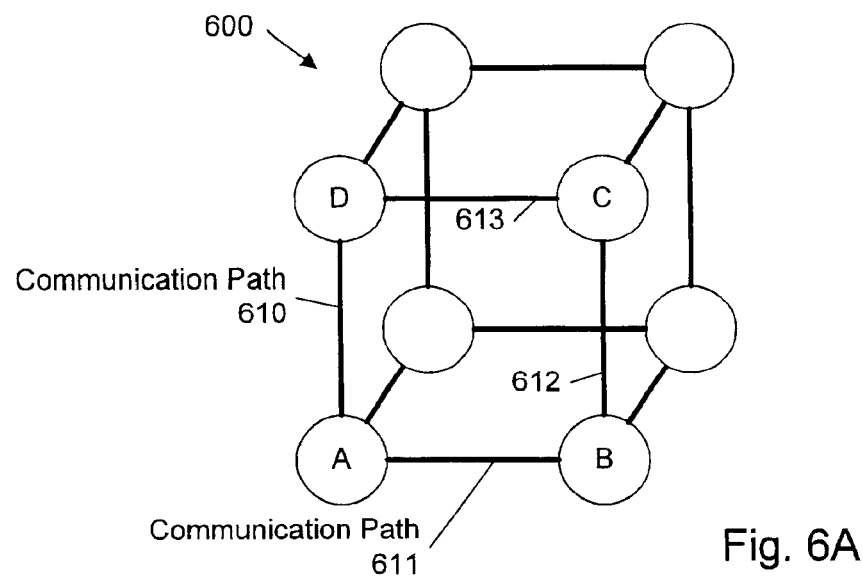
FIG. 6A is a diagram of one embodiment of a hypercube interconnection fabric.

Turning now to FIG. 6A, a diagram of one embodiment of a hypercube interconnection fabric is shown. A hypercube 600 may be employed as the interconnection fabric depicted in FIG. 1. In FIG. 6A, hypercube 600 has 8 nodes. Each node in hypercube 600 is connected to 3 neighboring nodes by three independent communications paths. Similar to the interconnection fabric shown in FIG. 1 and the torus interconnection fabric of FIGS. 3A and 3B, the nodes of hypercube 600 of FIG. 6A may also be configured to control or be connected to devices such as hard disks, cache memories, RAID controllers and host communications interfaces.

In general, a hypercube may be thought of as a structure with 2 to the power of n nodes. Hypercube 600 may be created, for example, by starting with a rectangle containing four nodes (e.g. a $2^2$ hypercube). To expand the structure, the 4 nodes are duplicated and connected to the existing 4 nodes forming hypercube 600, which is a $2^3$ hypercube. The nodes in the duplicated structure are connected to the nodes in the existing structure that are in the same location in the structure. Additionally, the value of the exponent 'n' may also identify the number of independent paths connected to each node.

Thus, if a node or communication path fails, another path may be used to communicate. For example, node A of FIG. 6A may be communicating with node D via a communication path 610. In the event that communication path 610 is detected as a failing path, an alternate path may be used. For example, the communication may be rerouted through the path including communication path 611, node B, communication path 612, node C and communication path 613.

Figure 6B:
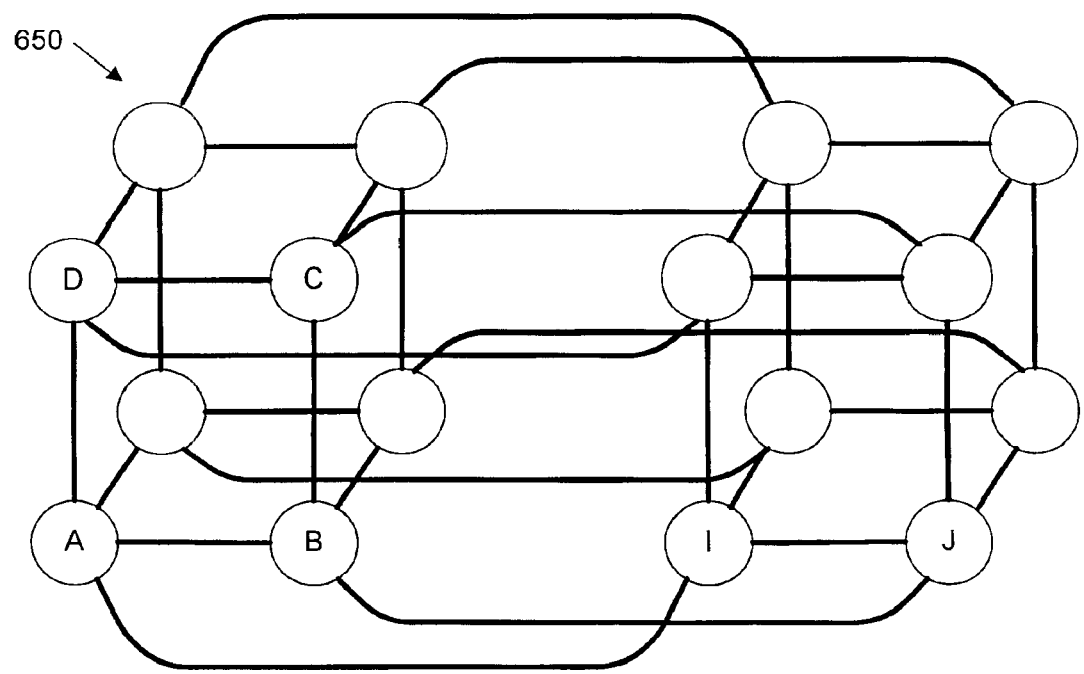
FIG. 6B is a diagram of another embodiment of a hypercube interconnection fabric.

Referring to FIG. 6B, a diagram of another embodiment of a hypercube interconnection fabric is shown. A hypercube 650 may be employed as the interconnection fabric depicted in FIG. 1. In FIG. 6B, hypercube 650 has 16 nodes. Hypercube 650 is an example of a $2^4$ hypercube. Each node in hypercube 650 is connected to 4 neighboring nodes by 4 independent communications paths. Thus hypercube 650 is also an interconnection fabric with multiple independent communication paths. Similar to the hypercube described in FIG. 6, the nodes of hypercube 650 of FIG. 6B may also be configured to control or be connected to devices such as hard disks, cache memories, RAID controllers and host communications interfaces.

Hypercube 650 may be constructed by duplicating the $2^3$ hypercube in FIG. 6A. Each node in the original structure is connected to each node in the duplicated structure that is in the same location in the hypercube. For example, node A in FIG. 6B is connected to node I and node B is connected to node J and so on for the remaining nodes.

Additionally, the multiple paths of hypercube 600 of FIG. 6A and hypercube 650 of FIG. 6B may allow for multiple parallel communications and/or disk operations nthat may be initiated over different paths, thereby possibly increasing the bandwidth and performance of the storage system. In a hypercube storage system with multiple controllers/host attachments, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

Figure 7:
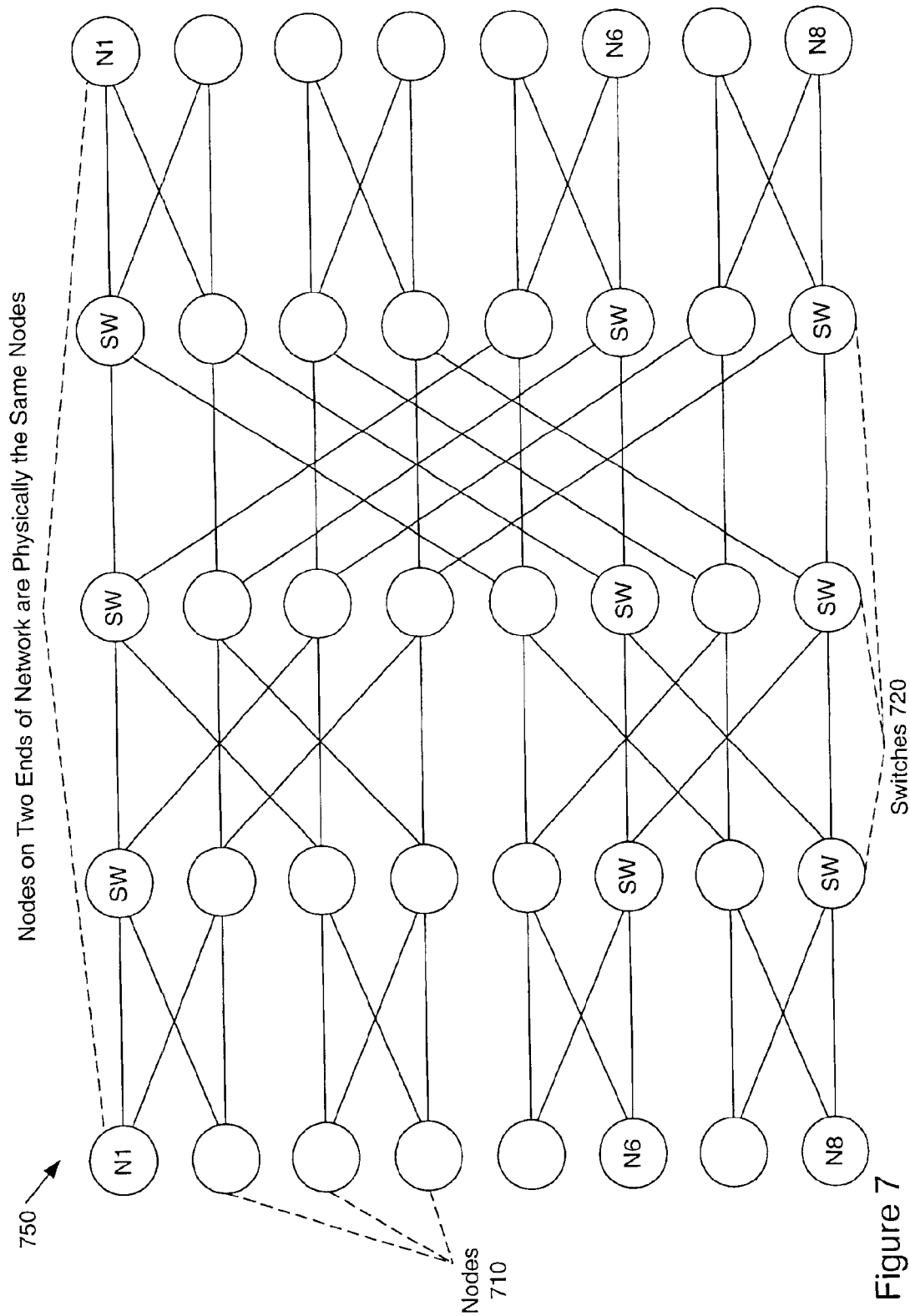
FIG. 7 is a diagram of one embodiment of a butterfly interconnection fabric.

Referring to FIG. 7, a diagram of an embodiment of a multiple path butterfly interconnection fabric is shown. A butterfly interconnection fabric 750 may be employed as the interconnection fabric depicted in FIG. 1. Butterfly interconnection fabric 750 includes nodes 710 and switches 720, which are interconnected via multiple communications paths. Similar to the interconnection fabric shown in FIG. 1 and the torus interconnection fabric of FIGS. 3A and 3B and the hypercubes of FIGS. 6A and 6B, nodes 710 and switches 720 of butterfly fabric 750 may communicate over multiple independent paths. Likewise, the nodes of butterfly 750 of FIG. 7 may also be configured to control or be connected to devices such as hard disks, cache memories, RAID controllers and host communications interfaces.

Butterfly interconnection fabric 750 may be referred to as a 2-path 8-node butterfly. In other embodiments, butterfly interconnection fabric 750 may be expanded into a Benes network (not shown), which is two back-to-back butterflies.

Additionally, the multiple paths of butterfly 750 of FIG. 7 may allow for multiple parallel communications and/or disk operations that may be initiated over different paths, thereby possibly increasing the bandwidth and performance of the storage system. In a butterfly storage system with multiple controllers/host attachments, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

Figure 8:
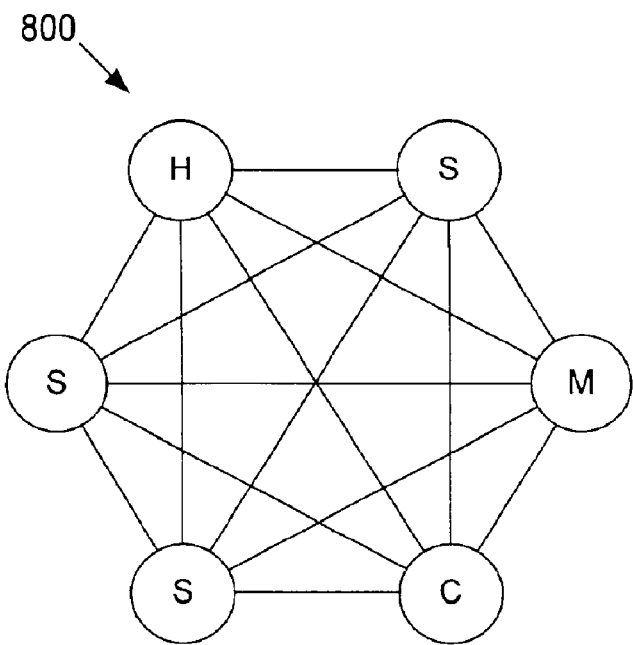
FIG. 8 is a diagram of one embodiment of a complete graph interconnection fabric.

Turning to FIG. 8, a diagram of one embodiment of a complete graph interconnection fabric is shown. A complete graph interconnection fabric 800 may be employed as the interconnection fabric depicted in FIG. 1. In FIG. 8, complete graph interconnection fabric 800 includes nodes coupled together by multiple independent communications paths. Similar to the interconnection fabrics described in the above figures, the nodes of complete graph interconnection fabric 800 may also be configured to control or be connected to devices such as hard disks, cache memories, RAID controllers and host communications interfaces.

Figure 9:
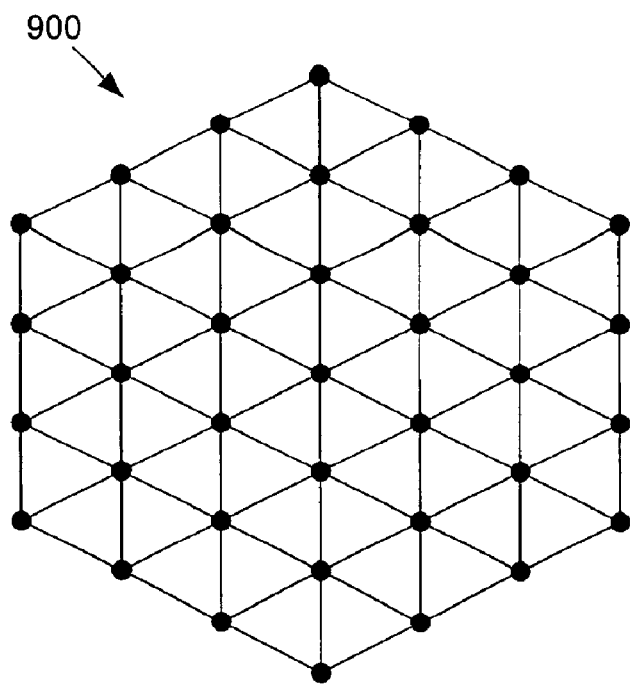
FIG. 9 is a diagram of one embodiment of a hex network interconnection fabric.

Referring to FIG. 9, a diagram of one embodiment of a hex network interconnection fabric is shown. A hex interconnection fabric 900 may be employed as the interconnection fabric depicted in FIG. 1. In FIG. 9, hex interconnection fabric 900 includes nodes interconnected by multiple independent communications paths. Similar to the interconnection fabrics described in the above figures, the nodes of hex interconnection fabric 900 may also be configured to control or be connected to devices such as hard disks, cache memories, RAID controllers and host communications interfaces.

Figure 10:
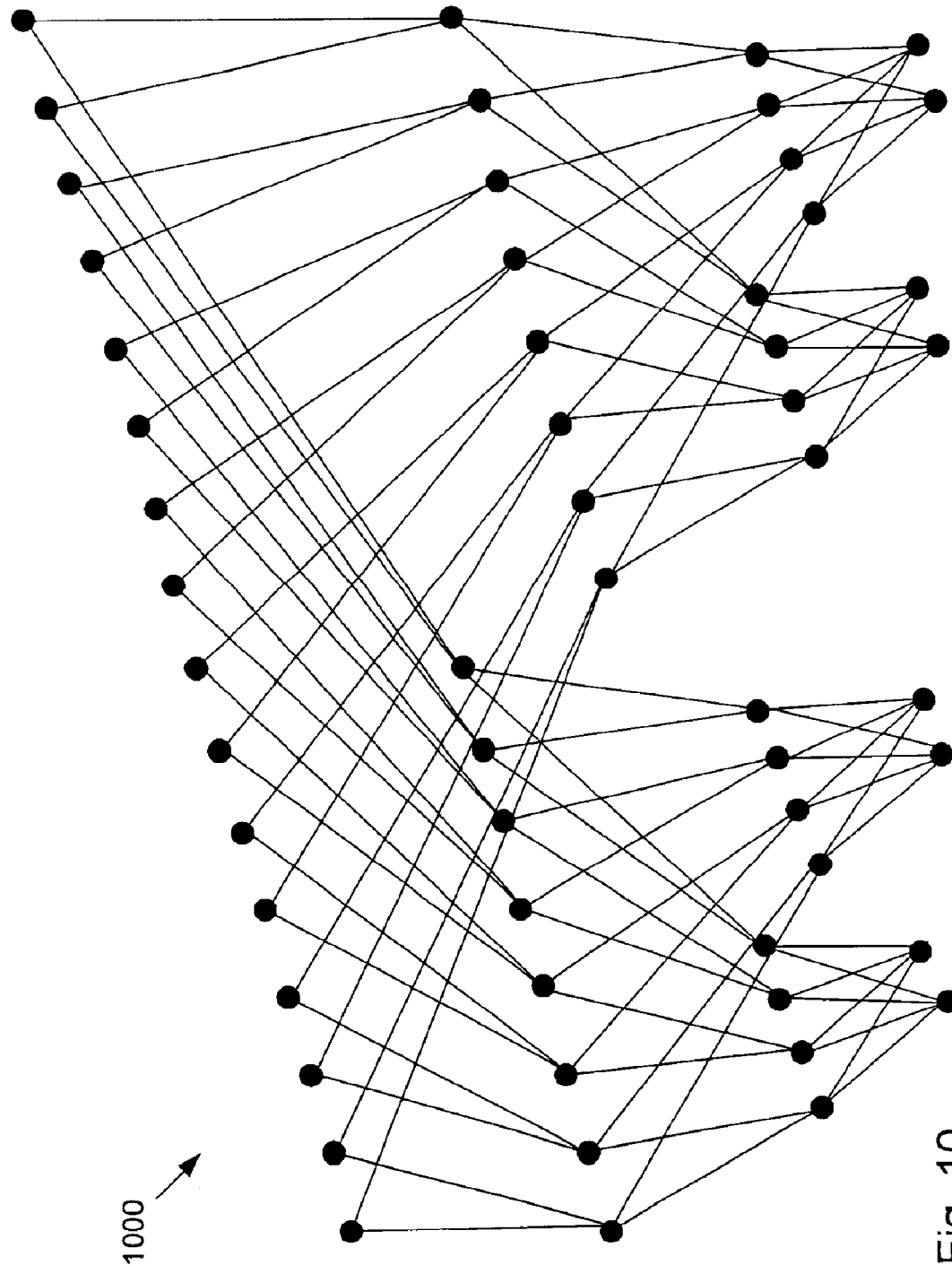
FIG. 10 is a diagram of one embodiment of a fat tree interconnection fabric.

Turning now to FIG. 10, a diagram of one embodiment of a fat tree interconnection fabric is shown. A fat tree interconnection fabric 1000 may be employed as the interconnection fabric depicted in FIG. 1. The fat tree interconnection fabric 1000 of FIG. 10 includes nodes interconnected by multiple independent communications paths. Similar to the interconnection fabrics described in the above figures, the nodes of fat tree interconnection fabric 1000 of FIG. 10 may also be configured to control or be connected to devices such as hard disks, cache memories, RAID controllers and host communications interfaces.

Additionally, the multiple paths of the interconnection fabrics described in FIGS. 8–10 may allow for multiple parallel communications and/or disk operations that may be initiated over different paths, thereby possibly increasing the bandwidth and performance of the storage system. In a storage system with multiple controllers/host attachments, such as those described above, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

Figure 11:
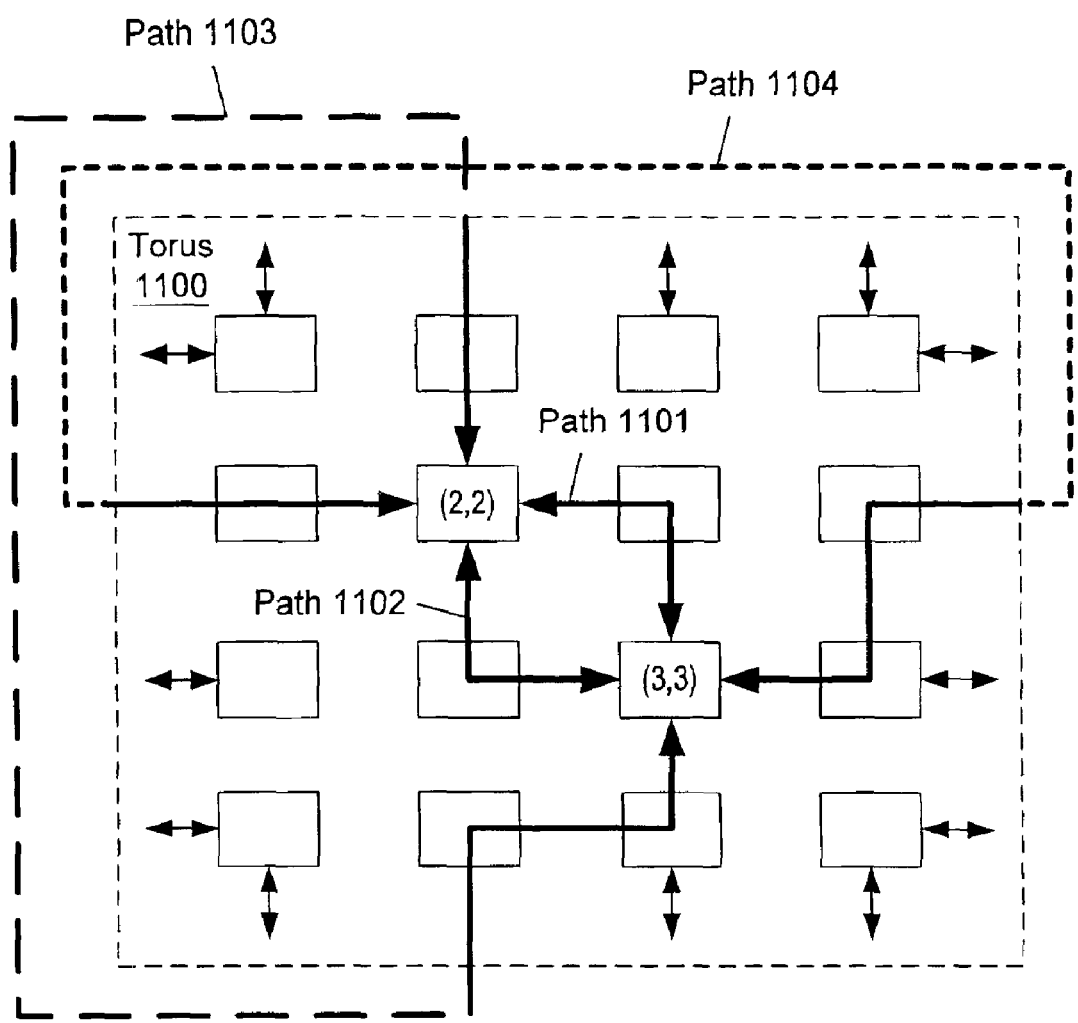
FIG. 11 shows a torus interconnection fabric and an example of the four independent paths that exist between each pair of nodes.

Routinely exercising redundant path(s) in an interconnection fabric may avoid situations where latent errors go undetected in a backup path until the path is critically needed. For example, by routinely choosing alternate independent paths to send communications, as illustrated in FIG. 5, latent errors may be detected in the alternate paths. FIG. 11 shows another example of routinely exercising redundant paths in a torus interconnection fabric 1100, according to an embodiment. Some of the interconnections in torus 1100 are not shown for clarity. Four independent paths exist between any pair of nodes, as exemplified by paths 1101–1104 between nodes 2,2 and 3,3. A routing system may be able to use all four of these paths to provide three-fault tolerance. However, if some of the routing paths are infrequently used, faults may develop over time or bugs may lay dormant in the fail-over mechanism. These errors may go undetected until the path is needed as a substitute for a failed path. To help avoid such situations, the redundant paths may be exercised routinely, even when they are not needed as substitutes for a failed primary path. Thus, one of the redundant paths may be selected to send a message even though another path is available to send that message. This principle can be applied to other types of multi-path interconnection fabrics as well.

One way to routinely exercise the backup routes may involve storing a plurality of redundant routes in a routing table. The sender may then select routes on which to send messages from the routing table. For example, if the interconnection fabric has four independent routes between each node pair like torus 1100 and a three-fault tolerant system is desired, all four of the paths may be stored as entries in a routing table. In some embodiments, less fault tolerance may be desired and thus fewer redundant paths may need to be routinely exercised. The sender may then cycle through the routing table as needed to send messages, choosing each route in succession. If each route is stored as a single entry in the routing table, all four of the stored independent routes may be exercised after sending four messages. Note that it is not necessary to have the routes stored as equal numbers of routing table entries. For example, such a routing table may store the first path three times, then store the second path once, then store the first path three more times, then store the third path once, and so on. As long as the routing table includes all of the secondary routes as at least one entry each and the sender selects each entry systematically, such a system may prevent errors from building up unnoticed in the secondary paths.

Of course, secondary paths may also be exercised routinely without using routing tables. Turning again to FIG. 11, the torus interconnection fabric 1100 is shown. In torus 1100, one node is labeled 2,2 and one node is labeled 3,3. These locations are described in terms of their position in the depiction of torus 1100 as an N by M array, such that a location 2,2 describes a node located at the intersection of the second row and second column. For ease of describing this embodiment, the origin of torus 1100 of FIG. 11 is located at the upper left corner and moving to the right means going in a positive M direction, and going down means going in a positive N direction. It is noted however, that in a torus interconnection fabric any point may be chosen as a zero reference point, since all points are interconnected.

Instead of using precalculated routes that are stored in a routing table, the route between two nodes may be calculated by subtracting one node's coordinates from the other's. For example, a node at location 2,2 is shown communicating with a node at location 3,3. Thus, (3,3)−(2,2)=(1,1); therefore, to get to 3,3 from 2,2 may require a single hop in the positive N direction followed by a single hop in the positive M direction. Alternatively, to get to 3,3 from 2,2 may require a single hop in the positive M direction followed by a single hop in the positive N direction. The actual path specification may be computed by the sender, or it may be deduced by the intermediate routing nodes through comparing the message destination address with their own. Even in such a simple scheme, there may always be at least two completely independent paths available between two nodes. Here, a sender may be configured to alternate between different methods of calculating the route from the sending node to the destination node. For example, the sender may alternate between sending a message in the M direction or the N direction first. By alternating in this way, the redundant paths are still exercised routinely.

Figure 12:
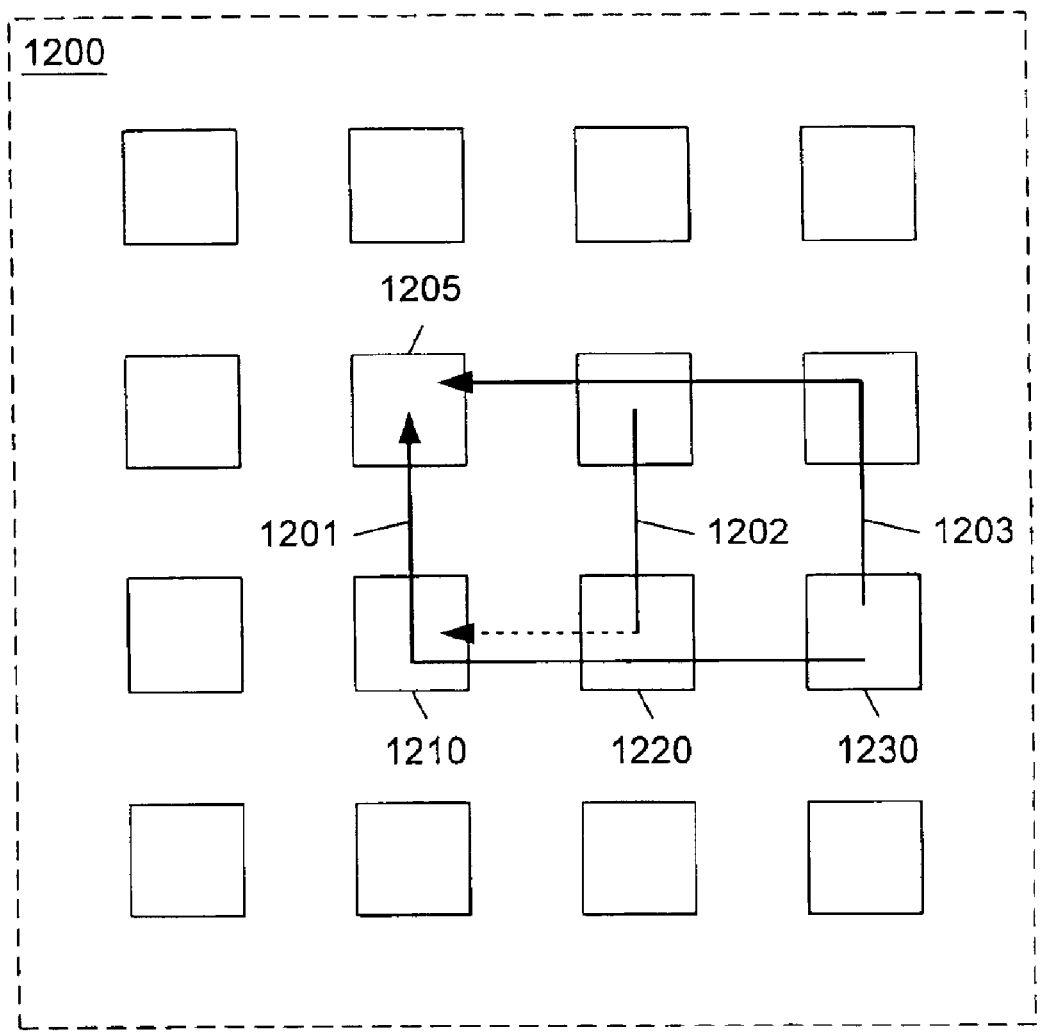
FIG. 12 shows an example of congestion in a multipath interconnection fabric.

While successful in exercising the redundant paths regularly, a routing system that simply alternates between the routes may not take advantage of situations where some paths are more efficient than others. For example, some paths may be more congested than others. FIG. 12 shows an example of congestion in interconnection fabric 1200. Interconnection fabric 1200 is meant to represent any multi-path interconnection fabric and is shown without interconnections between nodes for clarity. Routes 1201 and 1203 describe paths for sending messages between nodes 1230 and 1205. Route 1202 describes a route originating in node 1210 and passing through node 1220. Congestion can occur when more than one message is routed through the same portion of an interconnection fabric at the same time. For example, when messages are sent on routes 1201 and 1202, both routes require that the messages pass from the same output port of node 1220 to an input port of node 1210. If the messages arrive at node 1220 at roughly the same time, the message sent on path 1202 may have to wait until node 1220 has finished sending the message on route 1201 before continuing its progress, or vice versa. When this happens, the paths are said to be congested. In certain instances, a message sent on a congested route may wait so long that a time-out threshold is exceeded, causing that message to be discarded and, in some embodiments, resent on an alternate path.

By scheduling certain routes to be exercised more than others, congestion may be decreased. In FIG. 12, route 1203 avoids using any output port needed by path 1202 while still providing a path between the same node pair as route 1201. To decrease congestion, route 1203 may be designated as the preferred path between nodes 1230 and 1205. As a preferred path, route 1203 would be exercised more than the non-preferred, potentially congested route 1201. However, if both the alternate paths are to be exercised routinely, neither should be avoided entirely. In some embodiments, congestion may be decreased by assigning preference values to routes so that the preferred routes are largely non-overlapping. For example, if the interconnection fabric's traffic patterns are predicted, preference values can be assigned so that congestion is reduced by making less congested routes more preferred and vice versa.

In one embodiment, the alternate routes may be assigned preference values. Preference values may be assigned to decrease congestion by indicating that paths less likely to be congested should be exercised more frequently than paths more likely to be congested. Preference values may be any relative measure indicating how often to exercise a particular alternate route. For example, preference values may be expressed as rankings in some embodiments. In other embodiments, preference values may be expressed as percentages. Preference values may be assigned so that a higher preference value indicates that a route should be used more often. Alternately, in some embodiments, a lower preference value may indicate that a route should be selected more often. In some embodiments, explicit preference values may not be assigned. Instead, paths might be stored more or fewer times as routing table entries in a routing table to indicate their preference value. The sending node or device may cycle through the routing table, thus selecting each path according to the number of times it appears as a routing table entry.

Figure 13:
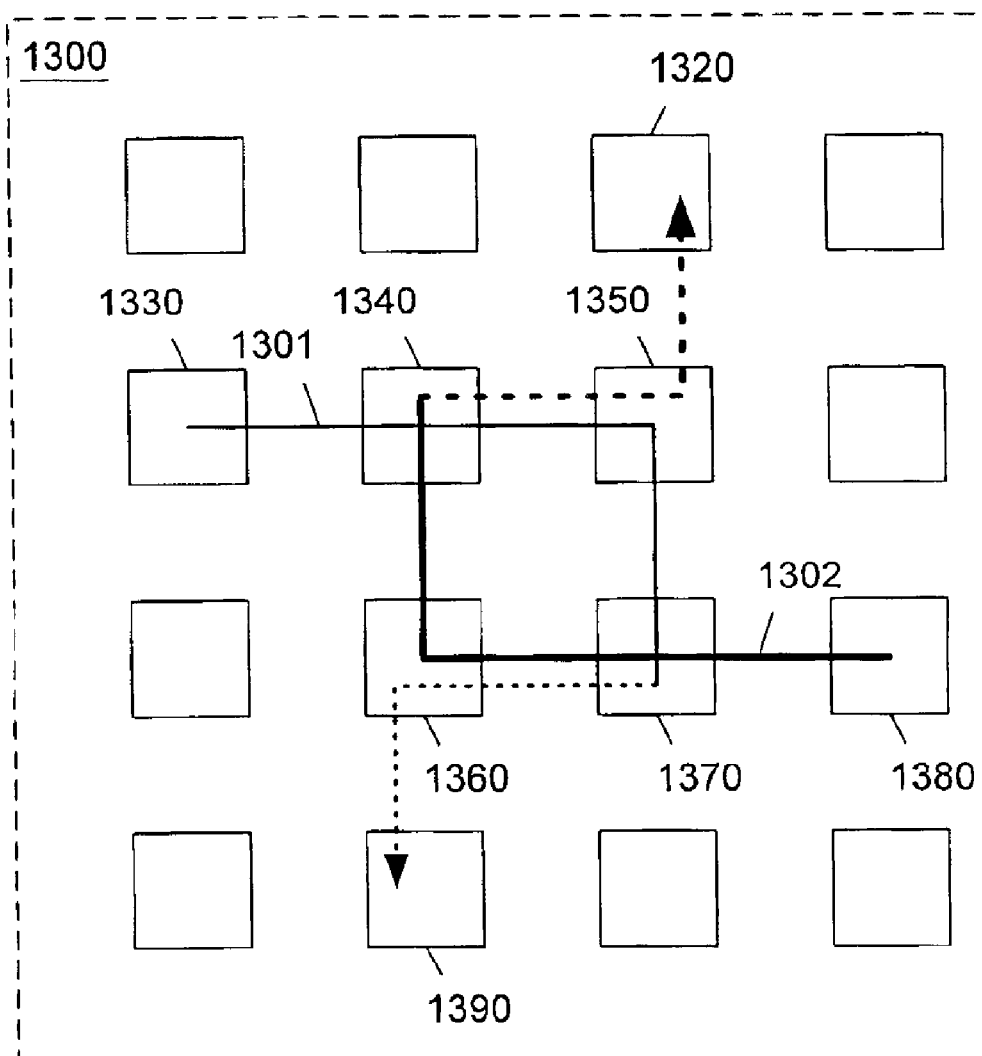
FIG. 13 shows an example of deadlock in a multipath interconnection fabric.

In addition to decreasing congestion, preference value assignment may also decrease the possibility of deadlock. Deadlock may occur when two messages, each dependent on the other's progress, become mutually blocked. FIG. 13 shows a possible deadlock scenario. Interconnection fabric 1300 is meant to represent any multi-path interconnection fabric and is shown without interconnections between nodes for clarity. A first message is being routed from node 1330 to node 1390 on route 1301. Meanwhile, a second message is traveling between nodes 1380 and 1320 on route 1302. Both messages need to be sent from node 1340 to node 1350 and from node 1370 to node 1360 in order to reach their destinations. Here, the message on route 1301 may be assigned node 1340's output port, and the message on route 1302 may be assigned node 1370's output port. Thus, when the message on route 1301 reaches node 1370, it may be unable to progress until the message on route 1302 is sent. However, the message on route 1302 may be waiting on the message on route 1301 at node 1340. Neither message may be able to continue if each is blocking the other. In some embodiments, one of the messages may be discarded and retried after a time-out threshold is exceeded. Preference values may be assigned to instruct a routing system to use potentially deadlocked paths less than other paths.

Figure 14:
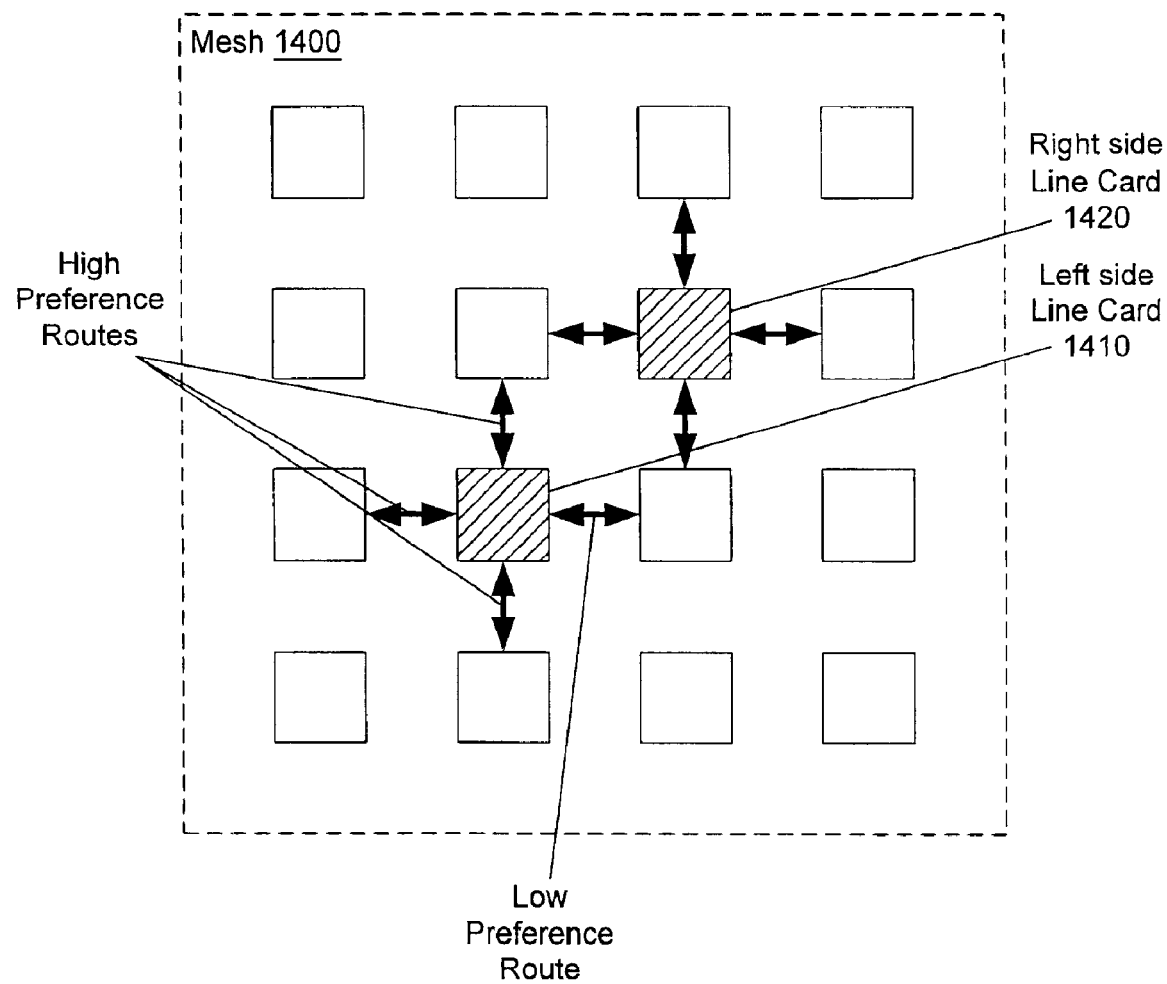
FIG. 14 shows an example of a multipath interconnection fabric, where the fabric is controlled by a pair of line cards.

FIG. 14 shows one example of assigning preference values so that congestion may be reduced. Interconnection fabric 1400 is meant to represent any multi-path interconnection fabric and is shown without interconnections between nodes for clarity. In FIG. 14, nodes 1410 and 1420 are coupled to line cards controlling interconnection fabric 1400. The line card coupled to node 1410 may primarily control the left side or region of fabric 1400 while the line card coupled to node 1420 may primarily control the right side or region of fabric 1400. For example, interconnect 1400 may connect a plurality of disk drives in a storage network. The line cards coupled to nodes 1410 and 1420 may include interfaces to host computers. Here, when choosing between alternate routes, routes from node 1410 that stay on the left side of the fabric may be given high preference values, while routes that cross onto the right side may be given low preference values. Similarly, right-sided routes from node 1420 may higher preference values than left-sided routes. A high preference value may indicate that a route should be chosen more often than a route with a lower preference value. By assigning preferences values in this way, path conflicts between the two line cards may be minimized.

One method of implementing a preference value scheme may use a routing table. Each alternate route may be assigned a preference value and then stored in the routing table a number of times proportional to its preference value. For example, if four alternate routes between a pair of nodes were assigned preference values of 4, 1, 7 and 3 respectively, the routes may each be stored a number of times equal to their preference value. Then, the sender may cycle through the routing table when sending messages between the nodes so that the first route is chosen 4 times out of every 15, the second route is chosen 1 time out of every 15 and so on. Alternately, if the sender calculates the routes, preference values assigned to the routes may indicate how often the sender should alternate between the various methods of calculation, where each of the various methods of calculation identifies a different alternate route. In other embodiments, the preference values may identify other ways to select among the various routes or the various routing table entries.

Even more flexibility to navigate around errors in the fabric may be gained by using updateable preference values. As congested routes are encountered, preference values may be updated so that these routes are exercised less often. These dynamic preference values may be useful because of their ability to reflect changes in the interconnection fabric. Dynamic preference values may reflect temporary changes in an interconnection fabric. For example, if a route is temporarily congested or deadlocked, communication attempts on that route may experience failures during the time the route is congested. The preference value for that route may be updated to reflect those failures, causing the route to become less preferred. Then, when the congestion clears, the route may experience fewer failures, and the corresponding preference value may increase to reflect this improved performance, thus instructing the sending node or device to use the route more often again. In a system using static preference values, if a route with a high preference value becomes permanently disabled, that route may still be tried fairly often. Consequentially, system performance may suffer due to the time spent repeatedly trying to send messages on the failed path. On the other hand, if a route with a dynamic preference value becomes permanently disabled, that route's dynamic preference value may be lowered, causing that route to be tried less often. If the permanent disability is removed, which may occur due to resetting or repair, a route with a dynamic preference value may automatically begin recruiting the route back into service. Thus, dynamic preference values may allow an interconnect fabric to "heal" itself automatically instead of requiring reconfiguration after a route has a permanent disability removed. This automatic healing ability is a result of never reducing a preference value so much that a corresponding route is completely eliminated from use. In other words, even permanently disabled routes may still be routinely tried, albeit less frequently than working routes, in embodiments where the automatic healing is desired. Alternately, in some embodiments, the repair of a broken route may include resetting the preference value assigned to that route.

With dynamic preference values, initial preference values may not need to be assigned. Instead, preference values may start at default values. As communications are sent over the interconnect, each path's performance may affect how its preference value is updated. In such embodiments, the preference values may increase or decrease from their default values to reflect the performance of the corresponding routes over time. Alternately, in some embodiments preference values may only be assigned to some routes and not others, and some of the routes assigned preference values may not have updateable preference values.

One way of implementing dynamic preference values may involve adjusting the preference value after every attempt to send a message on the associated route. If the message is sent successfully, the preference value may be updated to reflect the route's success and the route may become more preferred. If the message was not sent successfully, the preference value may be updated so that the route becomes less preferred. In such a system, the preference values may have a maximum and/or a minimum limit.

In other embodiments, the preference values may not be updated after every attempted use of a route. Instead, there may be a set time period or number of messages to be sent before the preference value is adjusted. For example, in one embodiment preference values might be updated at the end of a time period based on the corresponding routes' performance during that time period. Alternately, a route's preference values might be updated after a certain number of communications have been sent on that route based on the performance of the route when sending those communications.

In some embodiments, systems may want the preference value adjustment to track the actual performance of the corresponding route. One way of achieving this may be by building hysteresis into the system. This hysteresis may cause the preference values to fluctuate less rapidly and thus more accurately indicate routes' performance than the same preference values may indicate in systems without hysteresis. Hysteresis may prevent transient changes in a route's performance from dramatically affecting the preference value assigned to that route. One method of adding hysteresis may be to set a threshold value that must be reached before each preference value can be updated. This threshold value may be a number of successful/unsuccessful messages sent on the route. For example, a threshold value of 3 may require that 3 messages be sent successfully before increasing the preference value and/or that 3 messages be sent unsuccessfully before decreasing the preference value. The threshold value may also be a percentage of successes/failures in a certain period for the route. Generally, a threshold value could be any standard that indicates how often preference values should be updated for any particular route.

Turning now to Tables 1A and 1B, two different tables show how a dynamic preference value may fluctuate over time. Here, a route with a dynamic preference value is selected to send messages twenty times in the relevant period. In each chart, the preference value starts with an initial value of 5, which may correspond to a number of times that route is selected in relation to the number of times alternate routes are chosen. The preference value is updated in response to whether a message was sent successfully over the route or not. In this particular embodiment, a higher preference value indicates that a route is more preferred than a route with a lower preference value.

TABLE 1A

No Threshold Value

| Attempt | Success | Previous Preference Value | Updated Preference Value |
| --- | --- | --- | --- |
| 1 | No | 5 | 4 |
| 2 | Yes | 4 | 5 |
| 3 | Yes | 5 | 6 |
| 4 | No | 6 | 5 |
| 5 | No | 5 | 4 |
| 6 | No | 4 | 3 |
| 7 | No | 3 | 2 |
| 8 | No | 2 | 1 |
| 9 | Yes | 1 | 2 |
| 10 | Yes | 2 | 3 |
| 11 | No | 3 | 2 |
| 12 | Yes | 2 | 3 |
| 13 | Yes | 3 | 4 |
| 14 | Yes | 4 | 5 |
| 15 | Yes | 5 | 6 |
| 16 | Yes | 6 | 7 |
| 17 | Yes | 7 | 8 |
| 18 | No | 8 | 7 |
| 19 | Yes | 7 | 8 |
| 20 | Yes | 8 | 9 |

In Table 1A, there is no hysteresis mechanism and thus the preference value is updated immediately in response to every attempt to send a message on the route. If the message is sent successfully on the route, the preference value is increased. If the message is sent unsuccessfully, the preference value is decreased. A message may be sent unsuccessfully due to a temporary error in the route, such as a time-out caused by congestion, or because of a permanent failure in the route. Without any hysteresis, the route's preference value fluctuates rapidly from its initial value of 5, at times becoming as low as 1 or as high as 9. Note that Table 1A shows only one embodiment of a preference value system.

In other embodiments, a lower preference value may indicate that a route is more preferred. Additionally, other embodiments may not adjust the preference value after every attempt to send a message on the route.

TABLE 1B

Threshold Value = String of 5 Successes or Failures

| Attempt | Success | String of Successes | String of Failures | Previous Preference Value | Updated Preference Value |
|---|---|---|---|---|---|
| 1 | No | 0 | 1 | 5 | 5 |
| 2 | Yes | 1 | 0 | 5 | 5 |
| 3 | Yes | 2 | 0 | 5 | 5 |
| 4 | No | 0 | 1 | 5 | 5 |
| 5 | No | 0 | 2 | 5 | 5 |
| 6 | No | 0 | 3 | 5 | 5 |
| 7 | No | 0 | 4 | 5 | 5 |
| 8 | No | 0 | 5 | 5 | 4 |
| 9 | Yes | 1 | 0 | 4 | 4 |
| 10 | Yes | 2 | 0 | 4 | 4 |
| 11 | No | 0 | 1 | 4 | 4 |
| 12 | Yes | 1 | 0 | 4 | 4 |
| 13 | Yes | 2 | 0 | 4 | 4 |
| 14 | Yes | 3 | 0 | 4 | 4 |
| 15 | Yes | 4 | 0 | 4 | 4 |
| 16 | Yes | 5 | 0 | 4 | 5 |
| 17 | Yes | 1 | 0 | 5 | 5 |
| 18 | No | 0 | 1 | 5 | 5 |
| 19 | Yes | 1 | 0 | 5 | 5 |
| 20 | Yes | 2 | 0 | 5 | 5 |

In Table 1B, the same system is shown with a hysteresis mechanism added. Here, the hysteresis mechanism involves assigning a threshold value to the preference value of the route. The threshold value used here corresponds to a number of consecutive messages that must be sent successfully or unsuccessfully before the preference value is updated. For clarity, two additional columns have been added that track the number of successes and the number of failures that have occurred consecutively. In this example, the threshold value requires that a string of at least five successes or failures take place before the preference value can be updated. The five successes or failures specified in this example is provided as an example. In other embodiments, various other threshold values may be chosen. Note how the preference value fluctuates much less than the preference value shown in Table 1A does. When the route's performance is consistently less reliable, the preference value slowly decreases, and when the route's performance is consistently more reliable, the preference value slowly increases. Note that in both Table 1A and 1B, the preference value may drop to a minimum value if the route became permanently unavailable, just as it may rise to a maximum value if the route performs flawlessly every time it is used to send a message. One difference between the examples is that the use of the hysteresis mechanism dampens large fluctuations due to transient errors. In alternate embodiments, the threshold value may not require that the successes or failures be consecutive, as will be described in more detail below.

While the above examples updated the preference values simply according to the number of successes or failures, some embodiments may take time into account as well. For example, the threshold value may, in one embodiment, correspond to a time period. Preference values may be updated after that time period has elapsed based on the performance of their corresponding routes during the time period. Alternately, a threshold value may include both a time threshold and a number of successes/failures threshold in some embodiments. For example, a route may need to experience a threshold number of successes or failures during a threshold time period before the corresponding preference value is updated. If the threshold for successes or failures is not met within that time period, the preference value may not be updated, the performance for that time period may be forgotten or reset, and a new time period may be entered. This method may allow a route's performance to be reset periodically and thus prevent occasional successes or failures from accumulating over an extended time period and undesirably affecting a route's preference value. In yet another embodiment, the threshold value may be associated with a single counter that is incremented for each success and decremented for each failure. For example, the counter may be initialized to zero. Whenever the counter reaches ±3, the preference value may be increased or decreased accordingly. In this embodiment, mixed successes and failures negate each other so that the preference value is only updated when there is a burst of successive successes or failures.

Figure 15:
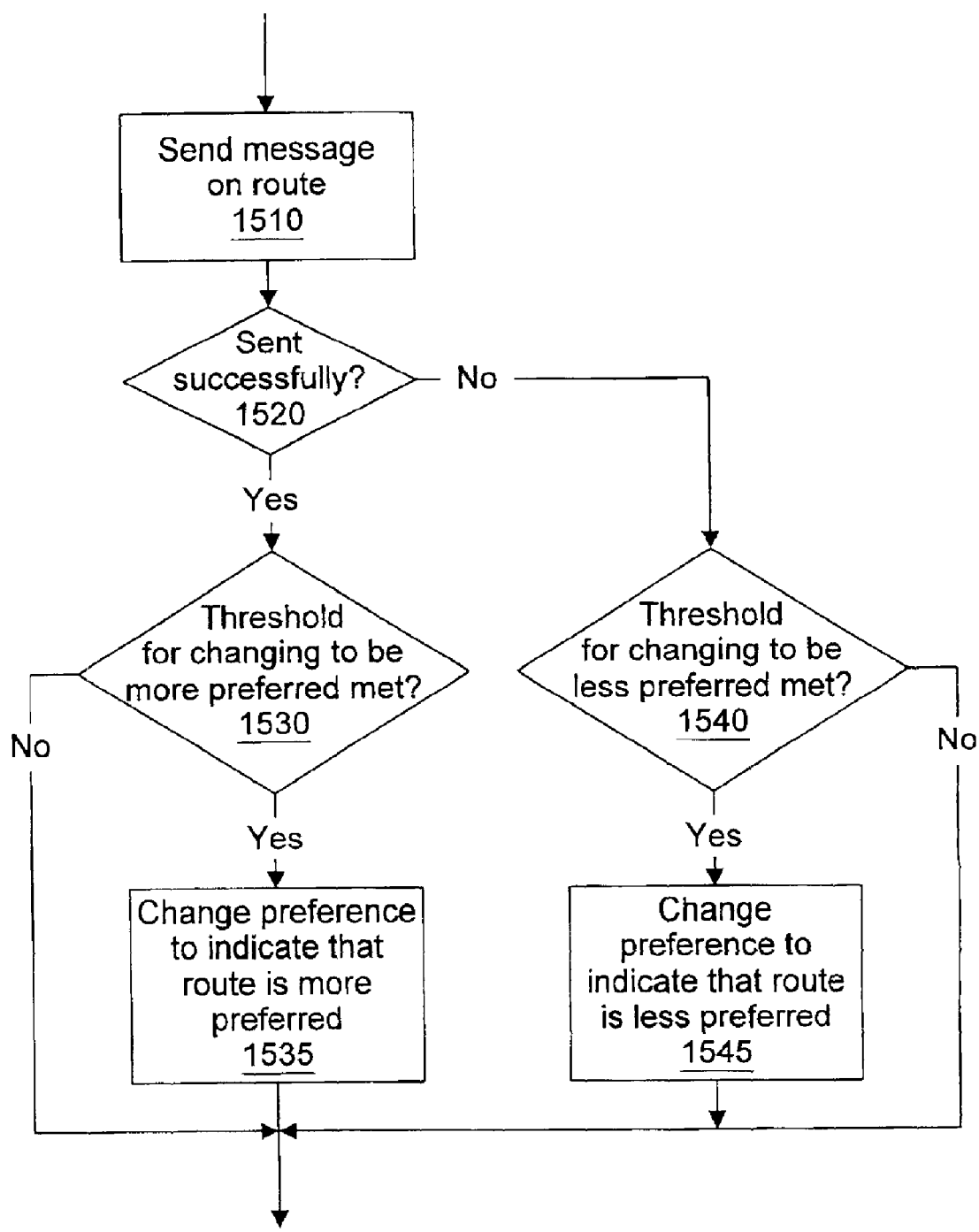
FIG. 15 is a flowchart showing one way a dynamic preference value may be updated.

In FIG. 15, a flowchart shows how a dynamic preference value may be updated by the sender in response to whether messages were sent successfully or not on the corresponding path. A sender may be either the sending node or a device configured to communicate with the sending node. For this example, a threshold value may be built into the system, so that a certain threshold must be met before the corresponding preference value will be updated. It is noted that embodiments may use different threshold values or have threshold values that express different requirements, such as a percentage, time period, successes/failures within a time period, etc. First, a sending node sends the message on the chosen route. In step 1520, the sender determines whether the message was sent successfully or not. Depending on the answer, the sender may then determine whether the threshold requirement for a change in preference is met in steps 1530 and 1540. Thus, if the message was sent successfully and the threshold for changing the preference value to indicate that the route has become more preferred is met, the preference value for the route may be changed to show that the route is now more preferred. Similarly, if the message was sent unsuccessfully and the threshold for changing the preference value to indicate that the route is less preferred has been met, the preference value may be changed to indicate that it is less preferred. In either case, if the threshold requirement is not met, the preference value will remain unchanged. Dynamic preference value updating, e.g. as illustrated by this flow chart, may apply separately to each route, so that each route's performance may be evaluated without regard to any other route's performance.

It should be noted that several different methods exist for implementing a threshold value. Instead of requiring a certain number of successes since the last increase, the threshold value may instead require a certain number of successes since the last update, regardless of whether the last update was an increase or a decrease. In other embodiments, the threshold value may distinguish between increases and decreases in the preference value. For example, the threshold value may allow a preference value to be lowered more quickly than it could be raised, or vice versa. In one such embodiment, the preference value may be decreased by dividing it by two and increased by adding one to it. In such an embodiment, it may take much longer for a route to increase than to decrease. Additionally, the threshold value for the preference value of one route may differ from a threshold value assigned to a preference value for another route. Also, in some embodiments, a success or failure on one route may cause the preference values assigned to other routes to be updated instead of or in addition to causing that route's own preference value to be updated. For example, referring to FIG. 11, if the independent route 1102 fails enough times to meet the condition for updating specified in a threshold, the preferences assigned to one or more of the other independent routes 1103, 1104, and 1101 may be increased instead of decreasing the preference assigned to the failed route 1102.

While some of the interconnection fabrics used as examples have four alternate routes available between node pairs, it is also contemplated that in some embodiments, more or less alternative routes may be included. In some embodiments, some of the alternate paths may not be completely independent and may include portions of the independent paths. In certain other embodiments, interconnection fabrics may be used that support more or less than four independent paths between nodes. In another embodiment, the independent paths may be retried many times in a round robin scheme. More specifically, the available alternate paths may be retried in a pattern.

Figure 16:
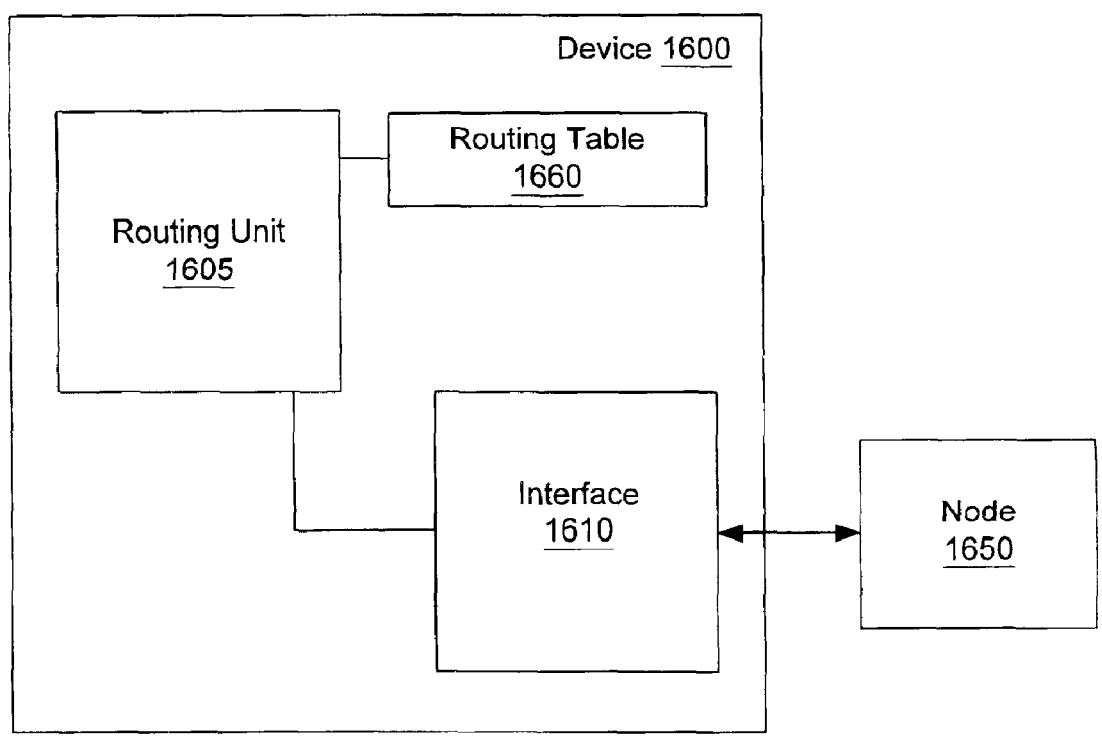
FIG. 16 illustrates a device configured according to one embodiment of the current invention.

FIG. 16 illustrates a device 1600 that may be configured according to one embodiment. The device 1600 has an interface configured to communicate with a node in an interconnection fabric. The device 1600 also has a controller 1605, which may be configured to maintain a routing table 1660. Alternately, the device may be configured to calculate routes and may not maintain a routing table. In some embodiments, the device 1600 may also include a disk drive. In other embodiments, the device 1600 may include a RAID controller. Alternately, the device 1600 may include a host interface or a line card configured to communicate with a host computer. The controller 1605 may be configured to identify a routing directive describing a route in the interconnection fabric so that messages can be sent from the node 1650 (source node) to another node (destination node) in the interconnection fabric. The controller 1605 may also be configured to encode the first routing directive in a message, and to communicate the message to the node 1650. The controller 1605 is configured to send a first message to a destination node in an interconnection fabric using a first route even though a second route is available. The controller 1605 is also configured to send a second message the destination node using the second route even though the first route is available. In this way, the controller 1605 exercises the redundant paths regularly in order to prevent errors from building up in redundant paths.

Numerous variations and modifications will become apparent to those skilled in the art once the above disclosure is fully appreciated. It is intended that the following claims be interpreted to embrace all such variations and modifications.

What is claimed is:

1. A method for routing communications in a storage system, comprising:
    receiving a communication to be sent from a source node to a destination node;
    selecting a communication path from a plurality of communication paths between the source node and the destination node, wherein said selecting the communication path comprises calculating the communication path, wherein said calculating further comprises calculating the communication path from a pair of coordinates identifying the source node and the destination node;
    sending the communication on the selected communication path from the source node to the destination node; and
    repeating said receiving, said selecting, and said sending for a plurality of communications to be sent from the source node to the destination node, wherein said selecting is performed so that each of the communication paths between the source node and the destination node is systematically selected at least once and whereby all of the communication paths are used for sending at least one of the communications;
    wherein each of the communication paths between the source node and the destination node is independent of the other communication paths.

2. The method as recited in claim 1, wherein the plurality of communications comprises communications to one or more disk drives.

3. The method as recited in claim 1, wherein said repeating said selecting comprises selecting each of the communication paths an equal number of times.

4. The method as recited in claim 1, further comprising:
    maintaining a routing table of the communication paths, wherein the routing table comprises a plurality of entries, wherein each entry indicates one of the communication paths; and
    wherein said selecting comprises selecting a next entry from the routing table.

5. The method as recited in claim 4, wherein a number of times that one of the communication paths is selected relative to the other communication paths corresponds to a number of entries for that communication path in the routing table.

6. The method as recited in claim 1, further comprising:
    detecting an error on one of the communication paths during said sending of one of the communications; and
    resending on a different one of the communication paths the one of the communications that was being sent when the error was detected.

7. The method as recited in claim 1, further comprising:
    assigning a preference to each of the plurality of communication paths between the source node and the destination node; and
    wherein said repeating said selecting comprises selecting each of the communication paths according to its preference so that a more preferred communication path is selected more often than a less preferred communications path.

8. A storage system, comprising:
    a plurality of nodes interconnected by an interconnection fabric, and wherein a portion of the nodes are coupled to one or more storage devices;
    a source configured to send a plurality of communications to a destination node, wherein the source comprises a source node and a source device configured to communicate with the source node;
    wherein the source is further configured to send a plurality of communications from the source node to the destination node by systematically selecting a communication path from a plurality of communication paths between the source node and the destination node and by sending a communication from the source node to the destination node on the selected communication path, wherein the source is further confirmed to select the communication path by calculating the communication path, wherein the source is further configured to calculate the communication path from a pair of coordinates identifying the source node and the destination node, and wherein the source is configured to repeatedly select communication paths and send communications until all of the communications are sent;

wherein the source is further configured to select each of the plurality of communication paths at least once and thus to send at least one of the communications on each of the communication paths; and wherein each of the plurality of communication paths between the source node and the destination node is independent of the other communication paths.

9. The storage system of claim 8, wherein the plurality of communications comprises communications to one or more disk drives.

10. The storage system of claim 8, wherein the source is further configured to select each communication path an equal number of times.

11. The storage system of claim 8, wherein the source is further configured to maintain a routing table of the plurality of communication paths, wherein the routing table comprises a plurality of entries, and wherein each entry indicates one of the communication paths.

12. The storage system of claim 11, wherein the source is further configured to select a communication path by selecting a next entry from the routing table.

13. The storage system claim 12, wherein the source is further configured to select one of the communication paths a number of times relative to the other communication paths, wherein the number of times corresponds to a number of entries for that communication path in the routing table.

14. The storage system of claim 8, wherein the source is further configured to receive an indication that an error occurred on one of the communication paths used to send one of the communications and to resend the communication that was being sent when the error occurred on a different one of the communication paths.

15. The storage system of claim 8, wherein the source is further configured to select each of the communication paths according to preferences assigned to each of the communication paths, wherein the source is configured to select a more preferred communication path more frequently than a less preferred path.

16. A device, comprising:

a interface configured to communicate with a source node in an interconnection fabric coupling together a plurality of nodes and providing a plurality of independent communication paths between the source node and a destination node; and a controller configured to communicate a plurality of communications to the source node to be sent on the independent communication paths to one or more disk drives coupled to the destination node;

wherein for each of the plurality of communications the controller is further configured to systematically select a communication path from the plurality of independent communication paths, encode the selected path in a communication, and communicate the communication via the interface to the source node, and wherein the controller is configured to repeatedly select communication paths, encode selected paths, and communicate communications until all of the communications are communicated via the interface to the source node;

wherein the controller is further configured to select each of the independent communication paths at least once and thus to encode each of the communication paths in at least one of the communications.

17. The device of claim 16, wherein the controller is further configured to select each communication path an equal number of times.

18. The device of claim 16, wherein the controller is further configured to maintain a routing table of the independent communication paths, wherein the routing table comprises a plurality of entries, and wherein each entry indicates one of the communication paths.

19. The device of claim 16, wherein the controller is further configured to select a communication path by selecting a next entry from the routing table.

20. The device of claim 19, wherein the controller is further configured to select one of the communication paths a number of times relative to the other communication paths, wherein the number of times corresponds to a number of entries for that communication path in the routing table.

21. The device of claim 16, wherein the controller is further configured to receive an indication that an error occurred on one of the communication paths used to send one of the communications, to encode a different one of the communication paths in the communication that was being sent when the error occurred, and to recommunicate that communication to the source node.

22. The device of claim 16, wherein the controller is further configured to select the communication path by calculating the communication path.

23. The device of claim 22, wherein the controller is further configured to calculate the communication path from a pair of coordinates identifying the source node and the destination node.

24. The device of claim 16, wherein the controller is further configured to select each one of the communication paths according to preferences assigned to each of the communication paths, wherein the source is configured to select a more preferred communication path more frequently than a less preferred path.

25. The device as recited in claim 16, wherein the controller comprises a RAID controller.

26. The device as recited in claim 16, wherein the controller comprises a host interface configured to communicate with a host computer.

27. The device as recited in claim 16, wherein the controller comprises a disk drive controller.

28. A node, comprising:

a routing unit;

a plurality of input ports; and a plurality of output ports;

wherein the node is configured to be connected to an interconnection fabric coupling together a plurality of nodes and comprising a plurality of independent communication paths between the node and a destination node;

wherein the routing unit is configured to send a plurality of communications on the independent communication paths to one or more disk drives coupled to the destination node;

wherein the routing unit is further configured to send the communications to the one or more disk drives coupled to the destination node by systematically selecting a communication path from the plurality of independent communication paths and sending a communication on the selected communication path, wherein the routing unit is further configured to calculate the communication path from a pair of coordinates identifying the source node and the destination node, and wherein the routing unit is configured to repeatedly select communication paths and send communications until all of the communications are sent; and wherein the routing unit is further configured to select each of the independent communication paths at least once and thus to send at least one of the communications on each of the communication paths.

29. The node of claim 28, wherein the routing unit is further configured to select each communication path an equal number of times.

30. The node of claim 28, wherein the routing unit is further configured to maintain a routing table of the plurality of independent communication paths, wherein the routing table comprises a plurality of entries, and wherein each entry indicates one of the communication paths.

31. The node of claim 30, wherein the routing unit is further configured to select a communication path by selecting a next entry from the routing table.

32. The node of claim 31, wherein the routing unit is further configured to select one of the communication paths a number of times relative to the other communication paths, and wherein the number of times corresponds to a number of entries for that communication path in the routing table.

33. The node of claim 28, wherein the routing unit is further configured to receive an indication that an error occurred on one of the communication paths used to send one of the communications and to resend the communication that was being sent when the error occurred on a different one of the communication paths.

34. The node of claim 28, wherein the routing unit is further configured to select each one of the communication paths according to preferences assigned to each of the communication paths, wherein the source is configured to select a more preferred communication path more frequently than a less preferred path.

35. A node, comprising:
a routing unit;
a plurality of input ports, wherein one of the input ports is configured to communicate with a RAID controller; and
a plurality of output ports;
wherein the node is configured to be connected to an interconnection fabric coupling together a plurality of nodes and comprising a plurality of independent communication paths between the node and a destination node;
wherein the routing unit is configured to send a plurality of communications on the independent communication paths to one or more disk drives coupled to the destination node;
wherein the routing unit is further configured to send the communications to the one or more disk drives coupled to the destination node by systematically selecting a communication path from the plurality of independent communication paths and sending a communication on the selected communication path, and wherein the routing unit is configured to repeatedly select communication paths and send communications until all of the communications are sent; and
wherein the routing unit is further configured to select each of the independent communication paths at least once and thus to send at least one of the communications on each of the communication paths.

36. The node as recited in claim 28, wherein one of the output ports is configured to communicate with a disk drive.

* * * * *

UNITED STATES PATENT AND TRADEMARK OFFICE
CERTIFICATE OF CORRECTION

PATENT NO. : 6,883,108 B2
DATED : April 19, 2005
INVENTOR(S) : Whay S. Lee and Randall D. Rettberg It is certified that error appears in the above-identified patent and that said Letters Patent is hereby corrected as shown below:

Column 20,
Line 62, please delete "confirmed" and insert -- configured -- in place thereof.

Signed and Sealed this

Twenty-sixth Day of July, 2005

JON W. DUDAS
*Director of the United States Patent and Trademark Office*